(12) United States Patent
Redman

(10) Patent No.: US 9,718,628 B2
(45) Date of Patent: Aug. 1, 2017

(54) APPARATUS INCLUDING CLAMP ASSEMBLY AND PALLET-RECEIVING ASSEMBLY

(71) Applicant: Paul Redman, London (CA)

(72) Inventor: Paul Redman, London (CA)

(*) Notice: Subject to any disclaimer, the term of this patent is extended or adjusted under 35 U.S.C. 154(b) by 0 days.

(21) Appl. No.: 15/421,728

(22) Filed: Feb. 1, 2017

(65) Prior Publication Data

US 2017/0166410 A1 Jun. 15, 2017

Related U.S. Application Data

(63) Continuation of application No. 14/440,217, filed as application No. PCT/CA2013/050835 on Nov. 1, 2013, now abandoned.

(60) Provisional application No. 61/721,352, filed on Nov. 1, 2012.

(51) Int. Cl.
| | |
|---|---|
| *B66F 9/07* | (2006.01) |
| *B65G 60/00* | (2006.01) |
| *B65G 1/00* | (2006.01) |
| *B65D 19/38* | (2006.01) |

(52) U.S. Cl.
CPC ............. *B65G 60/00* (2013.01); *B65D 19/38* (2013.01); *B65G 1/00* (2013.01); *B65D 2519/00776* (2013.01); *B65D 2519/00805* (2013.01)

(58) Field of Classification Search
CPC .......... B66F 9/183; B66F 9/0755; B66F 9/07; B66C 1/427; B65G 2201/0267; B65G 57/302

See application file for complete search history.

(56) References Cited

U.S. PATENT DOCUMENTS

| | | |
|---|---|---|
| 4,256,095 A | 3/1981 | Graham |
| 5,607,282 A | 3/1997 | Brannen et al. |
| 5,785,482 A | 7/1998 | Tanaka |
| 6,045,324 A | 4/2000 | Redman |
| 6,422,806 B1 * | 7/2002 | Jenkins ................ B65G 57/303 414/794.9 |
| 7,537,427 B2 | 5/2009 | Tygard |
| 8,814,238 B2 | 8/2014 | Tygard |

(Continued)

FOREIGN PATENT DOCUMENTS

| | | |
|---|---|---|
| EP | 0219780 A2 | 4/1987 |
| EP | 1369361 A1 | 12/2003 |
| FR | 2849648 A1 | 9/2004 |

(Continued)

OTHER PUBLICATIONS

Extended European Search Report, Application No. 18350759.5, dated May 31, 2016.

(Continued)

*Primary Examiner* — Rodney Mintz
*Assistant Examiner* — Daniel Kenny
(74) *Attorney, Agent, or Firm* — Brooks Kushman P.C.

(57) ABSTRACT

An apparatus includes a clamp assembly having a clamping zone configured to circumscribe, at least in part, a pallet load received, at least in part, in the clamping zone. The apparatus also includes a pallet receiving assembly having a pallet-receiving zone configured to receive, at least in part, a pallet supporting the pallet load, and, the pallet-receiving zone having a vertical height dimensioned marginally higher than the vertical height of the pallet.

29 Claims, 19 Drawing Sheets

(56) References Cited

U.S. PATENT DOCUMENTS

2015/0291306 A1* 10/2015 Redman ................ B65G 60/00
                                                        248/154

FOREIGN PATENT DOCUMENTS

| JP | 58100024 A | 6/1983 |
| JP | 2000053228 A | 2/2000 |
| JP | 20000233828 A | 8/2000 |
| WO | 2010057898 A1 | 5/2010 |

OTHER PUBLICATIONS

International Search Report, PCT/CA2013/050835, dated Feb. 5, 2014.
International Preliminary Report on Patentability & Written Opinion, Int'l appln No. PCT/CA2013/050835, dated May 5, 2015.
Baust; Pallet Changer PW 500; <www.baust-materialflusssysteme.de/index.php?id=344&L=1>; retrieved on Oct. 14, 2013.
International Search Report and Written Opinion; corresponding International application No. PCT/CA2013/050835; date of mailing Feb. 5, 2014.

* cited by examiner

APPARATUS INCLUDING CLAMP ASSEMBLY AND PALLET-RECEIVING ASSEMBLY

CROSS REFERENCE

This application is a continuation of U.S. Ser. No. 14/440,217, filed May 1, 2015, which is the U.S. national phase of PCT application No. PCT/CA2013/050835, filed Nov. 1, 2013, which claims the benefit of U.S. Provisional Patent Application Ser. No. 61/721,352, filed Nov. 1, 2012, entitled PALLET EXCHANGER, the entire contents of which are hereby incorporated by reference.

TECHNICAL FIELD

The technical field generally relates to pallet management systems.

BACKGROUND

Replacing pallets from a stack of products such as cases of beer, cans, crated produce, and other such items is a common occurrence during the manufacturing, distribution, and shipment of goods. For example, a manufacturing facility using plastic pallets to stack finished product may wish to transfer the product to more economical wooden pallets prior to shipping. Likewise, a production facility receiving the product, such as fresh produce, shipped on a wooden pallet may want to transfer the product to more hygienic plastic or metal pallets prior to introducing the product into the production facility.

Replacing pallets from a stack of products can be performed manually by re-stacking the product (a pallet load) on another pallet. This procedure, however is time consuming and ergonomically inefficient and difficult.

Although not strictly a pallet exchanger, another example apparatus that may be used to exchange pallets is disclosed in U.S. Pat. No. 6,045,324 (Stacking Clamp) of which the inventor is Redman. This apparatus is configured to stack selected layers of product on a pallet by placing a pallet load in the apparatus using a forklift truck, clamping the selected layers of product, removing the remaining pallet load, then placing a successive pallet load of different product in the apparatus and raising the pallet load to the lowermost surface of the previous clamped layer which is then released. A skilled person would understand that the entire pallet load could be clamped allowing for the pallet to be replaced using a forklift truck.

In another example apparatus, a stationary pallet exchanger as disclosed by Baust Materialflusssysteme's Pallet Exchanger Model Number PW 500 holds the pallet load in place using a side-clamping mechanism so that the pallet can be exchanged using a hand-operated pallet jack.

Problems associated with the above apparatuses include, for example, cost, complexity, lack of safety equipment, ability to handle a tall pallet load, and the inability to handle loads of different configurations.

SUMMARY

In an example embodiment, there is provided an apparatus, including a pallet-receiving assembly having a pallet-receiving zone configured to receive, at least in part, a pallet supporting the pallet load from a pallet transporter, the pallet-receiving zone positioned vertically below and adjacent to (proximate to) the clamping zone, the pallet-receiving zone having a vertical height dimensioned marginally higher than the vertical height of the pallet. The apparatus also includes a clamp assembly having a clamping zone configured to circumscribe, at least in part, each side of a pallet load received, at least in part, in the clamping zone. It will be appreciated that a pallet exchanger may include the clamp assembly and the pallet-receiving assembly.

In another example embodiment, there is provided an apparatus, including: a pallet exchanger including a pallet-receiving assembly having a pallet-receiving zone configured to receive, at least in part, a pallet supporting a pallet load from a pallet transporter. The pallet-receiving zone has a vertical height dimensioned marginally higher than the vertical height of the pallet. The pallet exchanger also includes a clamp assembly having a clamping zone configured to circumscribe, at least in part, each side of the pallet load received, at least in part, in the clamping zone. It will be appreciated that a pallet exchanger may include the clamp assembly and the pallet-receiving assembly. The pallet-receiving zone is positioned vertically below and adjacent to (proximate to) the clamping zone.

In another example embodiment, there is provided a method, including receiving, at least in part, a pallet supporting a pallet load in a pallet-receiving zone of a pallet-receiving assembly having a vertical height dimensioned marginally higher than the vertical height of the pallet. The method also includes circumscribing, at least in part, the pallet load received, at least in part, in a clamping zone of a clamp assembly.

In another example embodiment, there is provided a pallet exchanger including a first side frame and a second side frame disposed upon an operating surface in spaced apart and substantially parallel relation; a back frame disposed intermediate to the first side frame and the second side frame, and forming a close therewith having an open entry side for receiving a pallet with a pallet load; a gate moveably connected to the side frames, the gate in a separated and substantially parallel relation to the back frame, the gate having an open position and a closed position; a clamp assembly, attached to the frames and gate, to provide an inwardly directed controllable clamping force intermediate to the side frames, and intermediate to the back frame and gate for releasably gripping the pallet load; wherein, the bottom of the back frame (or the gate, or both) and the operating surface form an open sectional area allowing passage through the pallet (therethrough of the pallet); wherein, when the gate is in the open position, the pallet with pallet load can be received by or removed from the close; wherein, when the gate is in the closed position, the clamp assembly is operable for releasably gripping the pallet load within the close so that the pallet can be separated from the pallet load.

In another example embodiment, when the gate is in the open position, the clamp assembly is inoperable.

In another example embodiment, the clamp assembly includes a first instance of a compression assembly adjustably connected to the first side frame and the second side frame in opposing relation for controllably exerting an inwardly directed force between the frames (therebetween).

In another example embodiment, the clamp assembly includes a second instance of the compression assembly adjustably connected to the back frame and the gate for controllably exerting an inwardly directed force therebetween.

In another example embodiment, each instance of the first compression assembly and of the compression assembly includes: a pressure plate spaced inwardly of each frame member and gate; and an extension assembly sandwiched between at least one pressure plate and corresponding frame member or gate and fixedly attached thereto, the extension assembly being responsive to an applied amount of pressurized fluid for restorably extending the extension assembly along a longitudinal axis thereof and restorably displacing the pressure plate in the same direction.

In another example embodiment, the extension assembly is sandwiched between the first side frame member and the second frame member and corresponding instances of the pressure plate.

In another example embodiment, the extension assembly is sandwiched between the back frame and corresponding instances of the pressure plate.

In another example embodiment, the extension assembly is sandwiched between the front gate and corresponding instances of the pressure plate.

In another example embodiment, the extension assembly is sandwiched between one of the first or second side frame members and corresponding instances of the pressure plate, and another extension assembly is sandwiched between one of the rear frame or front gate and corresponding instances of the pressure plate.

In another example embodiment, the pressure plates each include a sloping wall portion disposed divertingly outwardly of the apparatus interior.

In another example embodiment, the pressure plates are coated with a urethane layer.

In another example embodiment, a tension spring assembly connected between a pressure plate and corresponding frame member for returning the pressure plate to a rest position when the pressurized fluid is released from the extension assembly is provided.

In another example embodiment, the extension assembly includes an expandable air bag.

In another example embodiment, the air bag includes a resilient boot.

In another example embodiment, the boot includes a cylinder having pleated side walls adapted to flexibly extend along the long axis of the cylinder.

In another example embodiment, the pressurized fluid includes compressed air.

In another example embodiment, each extension assembly includes at least two of the cylinders being spaced apart in a predetermined relationship.

In another example embodiment, the pallet exchanger further includes a control assembly for controllably applying the compressed air from a source to the cylinders.

In another example embodiment, the control assembly includes: a control valve having an outlet, and an inlet communicating with the compressed air source; and a plurality of air conduits communicating with the outlet of the control valve and the inlet connectors communicating with a corresponding instance of the cylinders.

In another example embodiment, the control assembly includes a programmable logic controller.

In another example embodiment, the pallet exchanger further includes a guide assembly for centrally positioning the pallet and the pallet load into the apparatus.

In another example embodiment, the guide assembly includes a pair of sloping rails disposed converging inwardly.

In another example embodiment, the gate is pivotally connected to either the first or second side frame.

In another example embodiment, the pallet exchanger further includes a locking assembly (not depicted) at the opposite end of the gate relative to the pivoting connection, and the locking assembly interfaces with a receiver on any one of the first side frame and the second side frame. The locking assembly may be located at an opposite end of the front gate relative to a moveable connection, and the locking assembly may releasably interface with a receiver on any one of the first side frame and the second side frame.

In another example embodiment, the clamp assembly is adjustable inwardly towards the pallet load and outwardly away from the pallet load.

In a second aspect, the pallet exchanger may have both a front gate and a rear gate for inline operation. The front gate and the rear gate may be mounted on the same side frame or on opposing side frames. The side frames may be supported by structural members running along the supporting surface, or under the operating surface, or otherwise connected and supported as understood by someone skilled in the art. The pallet exchanger could be loaded or unloaded via the front gate or the rear gate. For example, an embodiment of this aspect, may be used in a loading dock, where pallets with pallet loads are wheeled into the apparatus via one of the gates from a delivery truck, the gates lowered, the pallet load clamped, then the pallet exchanged, e.g. from a wooden pallet to a plastic pallet, then the pallet load unclamped, and the apparatus unloaded via the gate used to load the apparatus or the opposing gate. In another example, another embodiment of this aspect, an operating surface may include gravity rollers, in which the gravity rollers are configured for loading and unloading the pallets into the apparatus via the gates.

Now, an overview of the function of the pallet exchanger or apparatus for exchanging pallets is provided. Using an example embodiment, an operator first loads a pallet, and loads into the apparatus using a hand jack or equivalent "pallet and load-moving equipment". The apparatus may be secured to the ground or an operating surface such as a gravity roller.

The guide rails assist the operator in centering the pallet load in the apparatus by nudging the pallet and pallet load towards the center of the device.

The operator then lowers the front gate so that the pallet and the pallet load are circumscribed by the pressure plates of the clamping mechanism. The operator then pulls the pallet and the pallet load, using the hand jack or equivalent, towards the pressure plate of the front gate to minimize the distance between a side of the pallet load and the pressure plate on the front gate.

Depending on the size of the pallet load, the operator may adjust the distance of the side and rear pressure plates from its respective side of the pallet load by using an adjustment assembly on each of the adjustable connection members of the side and rear pressure plates.

If required, the operator may adjust the clamping pressure to be used on the pallet load. For instance, an operator may wish to use less clamping pressure for fragile pallet loads such as produce, whereas greater clamping pressure may be used for heavier or more robust pallet loads having beverage packaging (for example).

The operator then raises the pallet load, using the hand jack or equivalent, so that the bottom of the pallet load is substantially on the same plane as the bottom of the pressure plates circumscribing the pallet load. In order for the pallet to be separated from the pallet load, the pallet should not be in contact with any of the pressure plates while the clamp assembly has been activated.

The operator then activates the clamp assembly. In the example embodiment apparatus described above, an operator activates a pneumatic control assembly, for example using a switch or valve, allowing compressed air to flow into the pneumatic system. In another example embodiment, an operator activates an electrical switch (such as a button, lever, etc.) to activate an electrical control assembly, such as a programmable logic controller (PLC), to operate the apparatus or pneumatic system.

In the example embodiment provided, the pneumatic system is configured to first inflate the airbags connected on the rear frame, thereby activating the rear instances of the clamp assembly. The side instances of the clamp assembly are then activated after the rear pressure plate is frictionally connected to the pallet load. By activating the rear compression mechanism first, the pallet load is pushed towards the front pressure plate, thereby frictionally securing the pallet load front-to-back before engaging the side pressure plates.

In other configurations, however, the timing of the engagement of the pressure plates may be different. For example, in an in-line embodiment, all four pressure plates may engage the pallet load at approximately the same time. Furthermore, the engagement timing of a pressure plate may be affected by the numbers and configurations of actuators used in the device. For instance, in another example embodiment, only two pressure plates may have actuators while the opposite two powered pressure plates are stationary. A skilled technician would understand that alternate timings could be employed that would also secure safety of the pallet load.

Once the pallet load is frictionally gripped by the four pressure plates, the operator then lowers the hand jack (or equivalent) so that the pallet is separated from the pallet load. The operator then removes and replaces the pallet using the hand jack or equivalent through the gap in the front gate. Alternatively, the operator can replace the pallet by pushing the replacement pallet through the front gate, thereby displacing the original pallet through the gap in the rear frame.

Once the new pallet is in place, the operator raises the pallet to the pallet load using the hand jack or equivalent. When the new pallet is in contact with the bottom of the pallet load, the clamp assembly can be de-energized, thereby disengaging the pressure plates from the pallet load. In the example embodiment provided above, the operator opens an exhaust valve to allow compressed air to escape from the pneumatic system, thereby depressurizing the system. In another example embodiment, a user activates a second switch on the PLC to disengage the pressure plates from the pallet load.

Alternatively, for non-fragile pallet loads, the operator may de-energize the clamp assembly without raising the new pallet to be in contact with the bottom of the pallet load. In this example embodiment, the pallet load would drop onto the pallet when the clamp assembly is de-energized.

Circumscribing the pallet load with the clamp assembly provides for a measure of safety by ensuring that the pallet load is contained if a pallet load is crushed or buckles due to the clamping force or unforeseen circumstances. The repositionable arm also prevents users from approaching the pallet load while the apparatus is in operation.

Circumscribing the pallet load with a clamp assembly also helps to distribute the inwardly directed forces across more surfaces of the pallet load. Distributing the pallet load across more surfaces allows for the use of less force on each pressure plate, reducing the likelihood of damage to the pallet load. Furthermore, distributing the force across more surfaces of the pallet load allows the apparatus to be used with more fragile pallet loads.

Circumscribing the pallet load also allows for pallet loads of different configurations to be used on the device. For example, a four clamp system could be configured to handle the pallet loads where one or more sides of the pallet load are longer than the width of the pressure plate. In the example where the pallet load is longer than the side pressure plates, the front and back pressure plates would help to secure the pallet load when the clamp assembly is energized.

A four clamp mechanism with a movable arm allows for the support frame of the apparatus to be situated on the ground or operational surface without the need for overhead supports. Without overhead supports, the apparatus can exchange pallets of any arbitrarily tall instances of the pallet load.

A further benefit of having the apparatus at a low level relative to the operating surface is that a pallet and the pallet load do not have to be raised significantly in order to exchange pallets. This allows low level pallet jacks (such as hand-operated or powered pallet jacks) to be used in combination with the device. In contrast, devices known in the art require the use of a fork truck or may invert the pallet and the pallet load.

The disclosed apparatus is inexpensive to manufacture for reasons such as its mechanical simplicity.

The disclosed apparatus has a relatively small operational footprint.

Figure 1A:
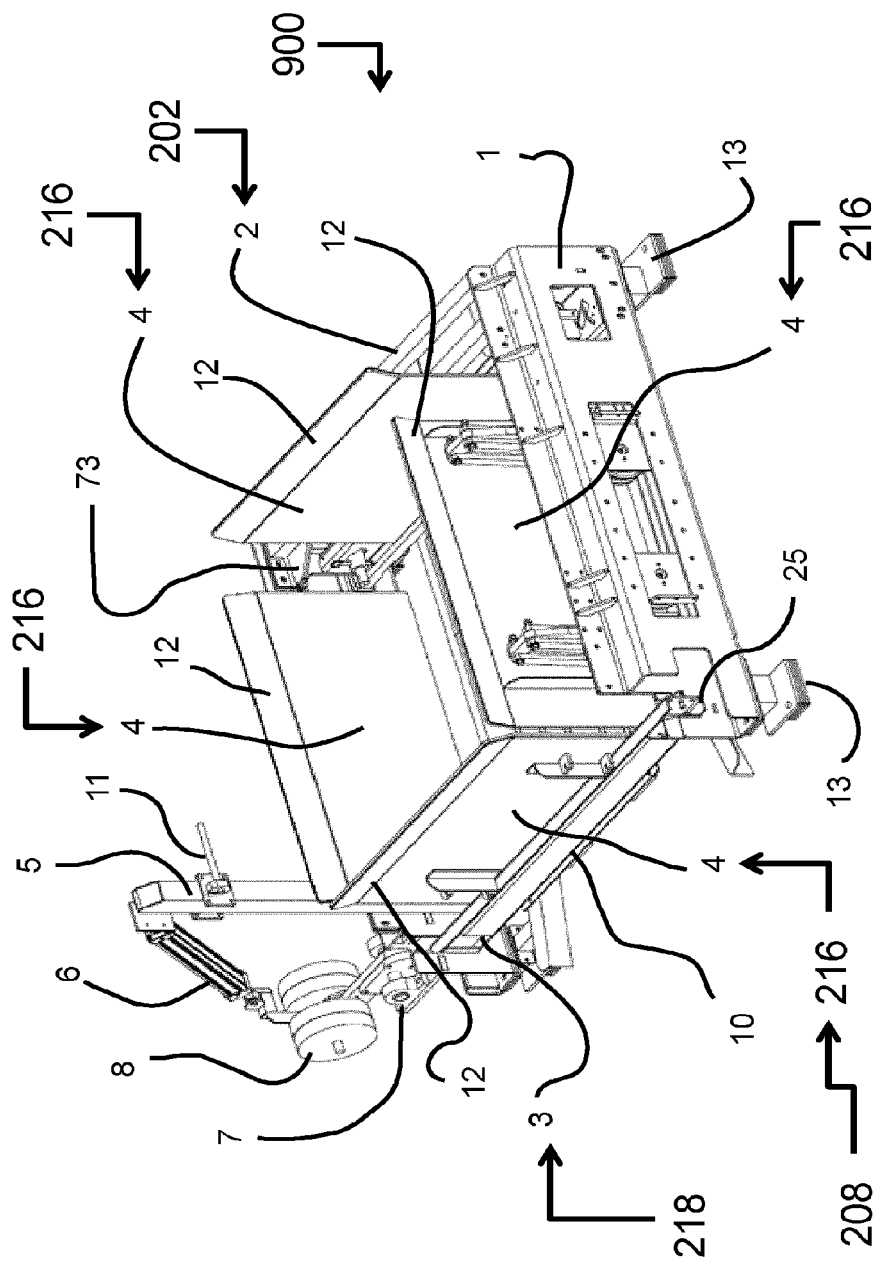
FIG. 1A (SHEET 1/19) is a perspective view illustrating an example embodiment of the apparatus.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 1 first side frame
2 rear frame
3 front gate
4 pressure plate
5 post
6 actuator
7 pivoting assembly
8 counterweight
10 gate arm
11 latch
12 outwardly diverging sloping wall portions
13 risers
21 guide rails
22 second side frame
25 gate receiver
30 support member
31 two movable arms
32 plate arm
33 inflating assembly
34 airbag
35 air-bag connection member
36 pressure-plate connection member
41 cam
61 linkage
62 chain
63 air-bag spring
71 adjustable male connection member rod
72 female connection member tube
73 rear pressure plate support
74 cam rollers
75 guides
76 quick release pin
91 air-bag linkage
92 plate-linkage
93 cotter pin
111 receiver spring
112 pallet
200 adjustment assembly
202 back frame
208 clamp assembly
212 deflation assembly
214 extension assembly
216 compression assembly
218 first gate
222 guide assembly
232 side compression assembly
234 sides
236 tension spring assembly
238 travel-limiting assembly
802 pallet load
804 pallet transporter
900 apparatus
902 pallet exchanger
904 clamping zone
906 pallet-receiving assembly
908 pallet-receiving zone

DETAILED DESCRIPTION OF THE EXEMPLARY EMBODIMENTS

FIG. 1A is a perspective view illustrating an example embodiment of the apparatus (900).

FIGS. 1B to 1G depict the schematic representations of the states of the apparatus (900) of FIG. 1A. FIGS. 2A to 2L depict an example embodiment of the apparatus in the states shown by the schematic representations of FIGS. 1B to 1G.

With reference to FIGS. 1B to 1G and 2A to 2L, in general terms, the apparatus (900) includes a pallet exchanger (902). The pallet exchanger (902) includes a pallet-receiving assembly (906) having a pallet-receiving zone (908). The pallet-receiving zone (908) is configured to receive, at least in part, a pallet (112) supporting the pallet load (802) from a pallet transporter (804). The pallet-receiving zone (908) is positioned vertically below and adjacent to (proximate to) the clamping zone (904). The pallet-receiving zone (908) has a vertical height that is dimensioned marginally higher than the vertical height of the pallet (112). As well, the pallet exchanger (902) includes a clamp assembly (208) having a clamping zone (904) being configured to circumscribe, at least in part, each side of a pallet load (802) received, at least in part, in the clamping zone (904).

An advantage of the clamp assembly (208) is that the pallet load (802) may be prevented from bowing along at least one side of the pallet load (802) while the clamp assembly (208) applies a clamping force to the pallet load (802); in this manner, the pallet load (802) remains in a safe and securely clamped condition for the case where, the pallet (112) is to be removed from the pallet-receiving zone (908). For example, a pallet transporter (804) may be used to remove the pallet (112) from the pallet-receiving zone (908) for the case where the pallet (112) is to be replaced by another instance of the pallet (112).

An advantage of the pallet-receiving assembly (906) is that the pallet (112) may be displaced or moved from the pallet load (802) while the clamping force is applied to the pallet load (802) (if so required); the amount of movement of the pallet (112) is such that less energy and work effort and time may be used in order to move or displace the pallet (112) along the vertical height of the pallet-receiving zone (908) because the vertical height of the pallet-receiving zone (908) is dimensioned marginally higher than the vertical height of the pallet (112).

In view of the above, there is provided a method, including receiving, at least in part, a pallet (112) supporting a pallet load (802) in a pallet-receiving zone (908) of a pallet-receiving assembly (906) having a vertical height dimensioned marginally higher than the vertical height of the pallet (112). The method also include circumscribing, at least in part, each side of the pallet load (802) being received, at least in part, in a clamping zone (904) of a clamp assembly (208).

For example, the apparatus (900) may be incorporated in a low-level pallet exchanger. For this case, an instance of the clamp assembly (208) may be moved (temporarily) of the way in order to permit entrance of the pallet (112) into the pallet-receiving zone (908) (this concept is described in more detail below in connection with FIGS. 2A to 2L, and 3, etc.). The clamp assembly (208) is positioned proximate to the ground or factory floor (for instance, nine inches vertically above the factory floor). The advantage of the low-level pallet exchanger is that the low-level pallet exchanger may be used by walkie riders or pallet jacks, and not have to require a fork truck (but may be used with a fork lift truck if required to do so). A pallet jack is a machine that raises the pallet (112) vertically up by about two inches to three inches above the factory floor. Fork trucks are a much more expensive and therefore there are many more instances of the pallet jack deployed in the market. Smaller warehouses may have no or at most a single instance of the fork truck, and have several instances of the pallet jack. The low-level pallet exchanger may include an arrangement in which loading of the apparatus (900) is accomplished by one instance of the clamp assembly (208) being moved out of the way (pivoted upwardly or slide-moved to one side) allowing the pallet (112) to enter the apparatus (900). The low-level pallet exchanger may include an arrangement in which the pallet load (802) does not have to be slid as the pallet (112) is removed (thus preventing inadvertent damage to the bottom of the pallet load (802). The low-level pallet exchanger may include instances of the clamp assembly (208) that may be air powered verses hydraulic powered (if so desired). The low-level pallet exchanger may include four instances of the clamp assembly (208) that may be used. The low-level pallet exchanger may be arranged as a stationary machine (as opposed to having clamps attached to a fork truck (for instance). The low-level pallet exchanger may be deployed on a movable apparatus (if so desired). The low-level pallet exchanger may include having the instances of the clamp assembly (208) attached to a fork truck (if so desired).

For example, the apparatus (900) may be incorporated in an in-line arrangement of a pallet exchanger. For this case, instead of having an instance of the clamp assembly (208) move (temporarily) out of the way in order to permit entrance of the pallet (112) into the pallet-receiving zone (908), a front and a rear instances of the clamp assembly (208) may be moved away (pivoted or moved linearly side-ways) to allow the pallet (112) to enter the pallet-receiving zone (908). The instances of the clamp assembly (208) are then moved in place, the instances of the clamp assembly (208) are actuated to clamp the pallet load (802), the pallet (112) is dropped down, for example by three inches, and the pallet (112) is conveyed out from the pallet-receiving zone (908), and then another instance of the pallet 9112) may be loaded in to the pallet-receiving zone (908) and positioned under the pallet load (802) being held and clamped in place; then, the pallet (112) is lifted to the pallet load (802) and the clamp assembly (208) is disabled to release the pallet load (802) onto the pallet (112). The front and back instances of the clamp assembly (208) are moved out of the way and the pallet (112) along with the pallet load (802) are conveyed out of the working area of the in-line arrangement of the pallet exchanger.

Referring to FIG. 1B, FIG. 2D, and FIGS. 10, 2E, and 2F, more specifically, the clamp assembly (208) is configured to clamp and/or hold the pallet load (802) received in the pallet-receiving assembly (906); this is done in such a way that the pallet (112) no longer supports the pallet load (802), and the pallet transporter (804) removes the pallet (112) without the pallet load (802) from the pallet-receiving assembly (906) while the clamp assembly (208) continues to hold the pallet load (802). An example of the pallet transporter (804) includes a pallet jack (hand jack) and/or a fork-lift truck having forks extending outwardly, and the forks are used to pick up and move and place the pallet (112) as required. The pallet jack is also known as a pallet truck, pallet pump, pump truck, or jigger. The pallet jack is a tool used to lift and move pallets. The front wheels of the pallet jack are mounted inside the end of the forks, and as the hydraulic jack is raised, the forks are separated vertically from the front wheels, forcing the pallet load upward until the forks clear the floor. The pallet is only lifted enough to clear the floor for subsequent horizontal travel. The pallet-receiving zone (908) is located proximate to the clamp assembly (208).

Figure 1B:
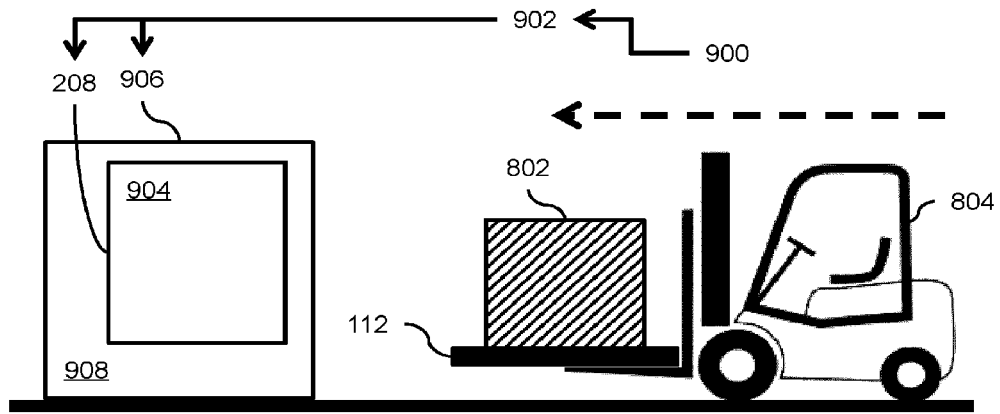
FIGS. 1B, 1C, 1D (SHEET 2/19) depict schematic representations of states of the apparatus of FIG. 1A.
Figure 2A:
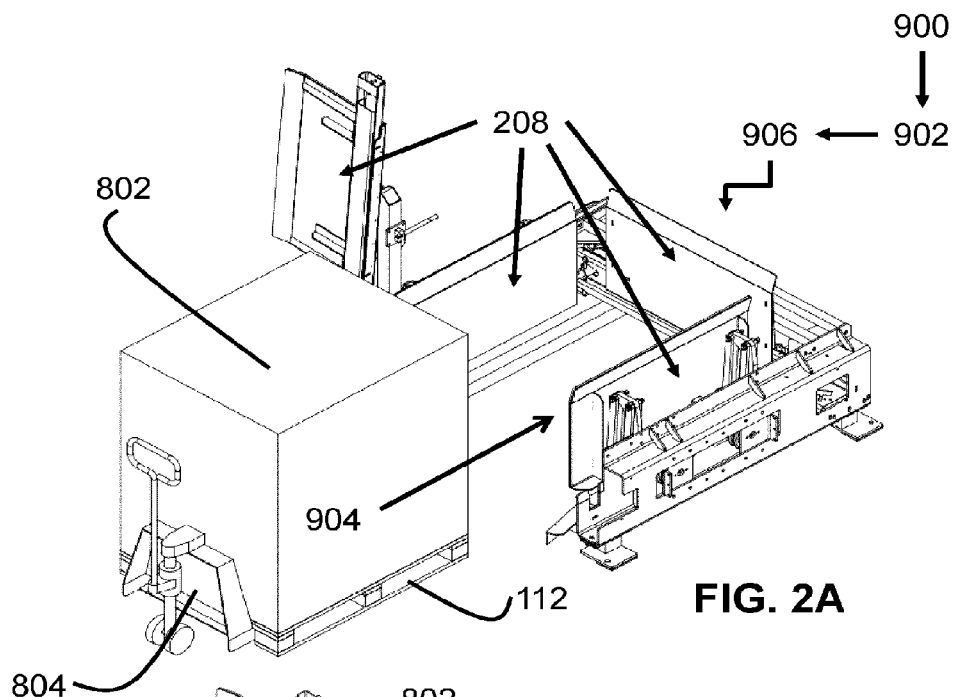
FIGS. 2A, 2B (SHEET 4/19) depict an example embodiment of the apparatus in the states shown by the schematic representations of FIGS. 1B to 1G.
Figure 2B:
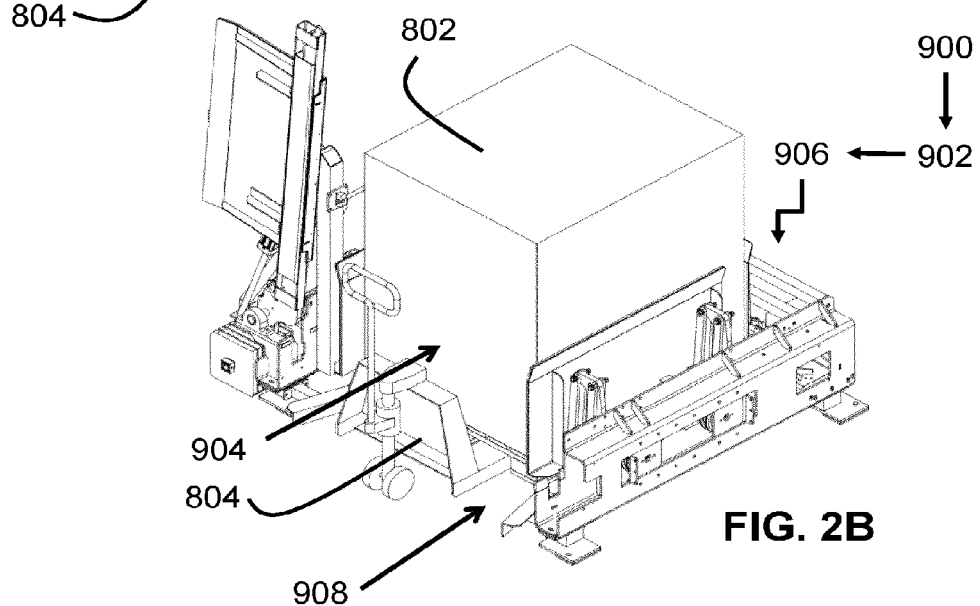
Figure 2C:
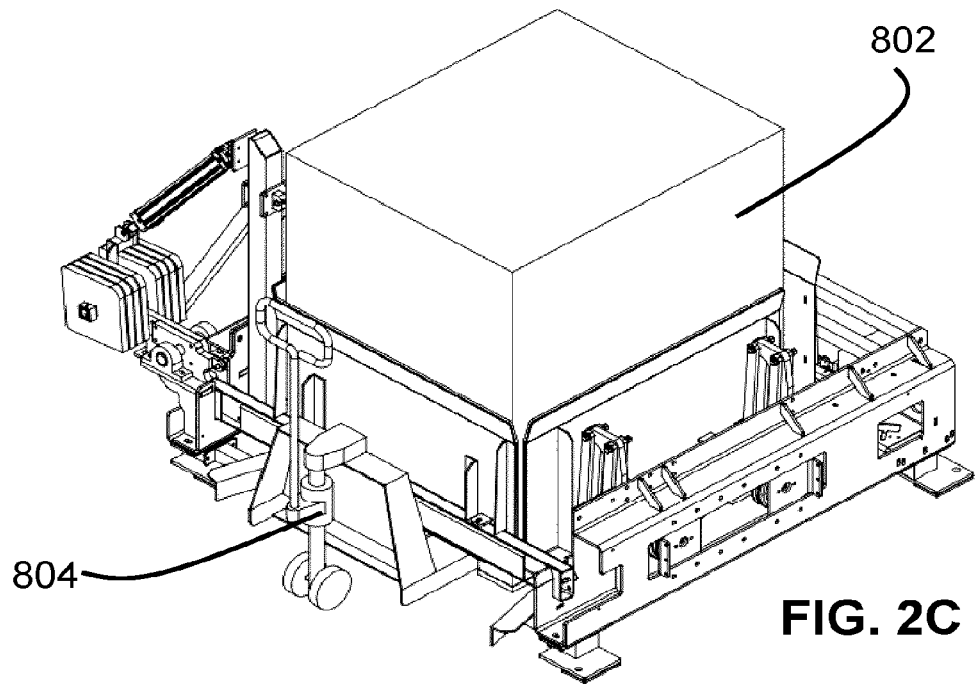
FIGS. 2C, 2D (SHEET 5/19) depict an example embodiment of the apparatus in the states shown by the schematic representations of FIGS. 1B to 1G.
Figure 2D:
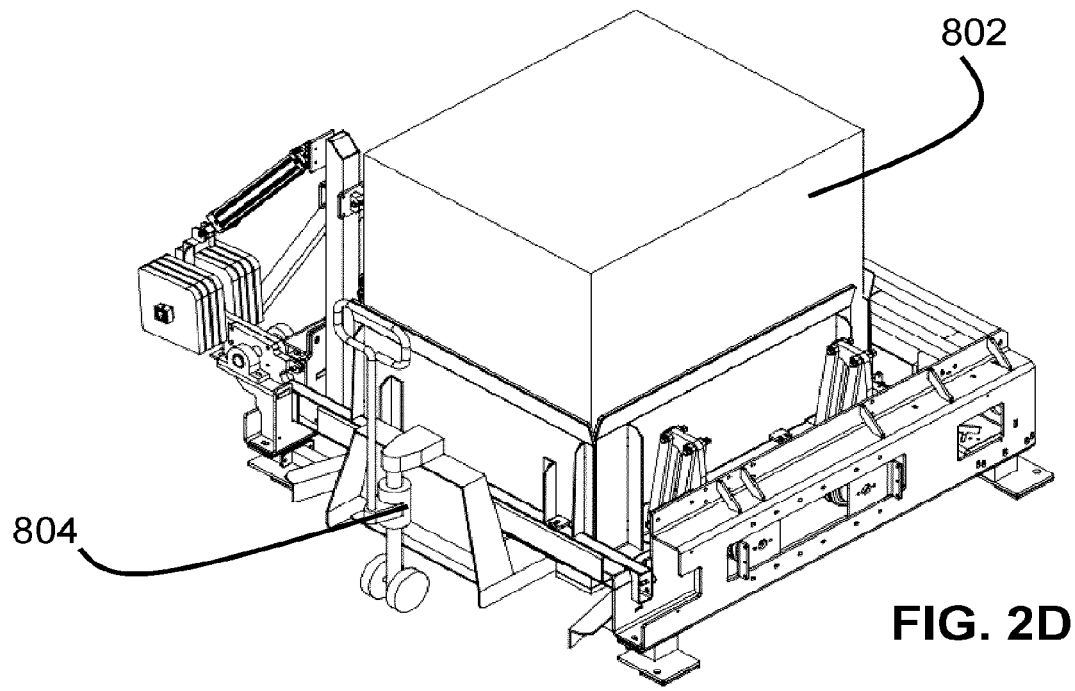
Figure 2E:
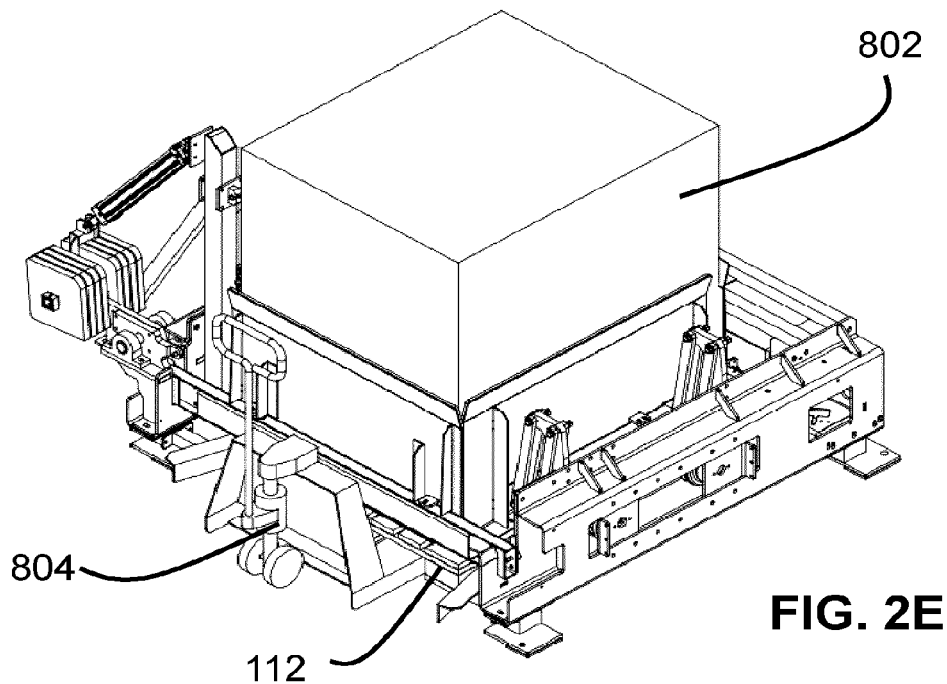
FIGS. 2E, 2F (SHEET 6/19) depict an example embodiment of the apparatus in the states shown by the schematic representations of FIGS. 1B to 1G.
Figure 2F:
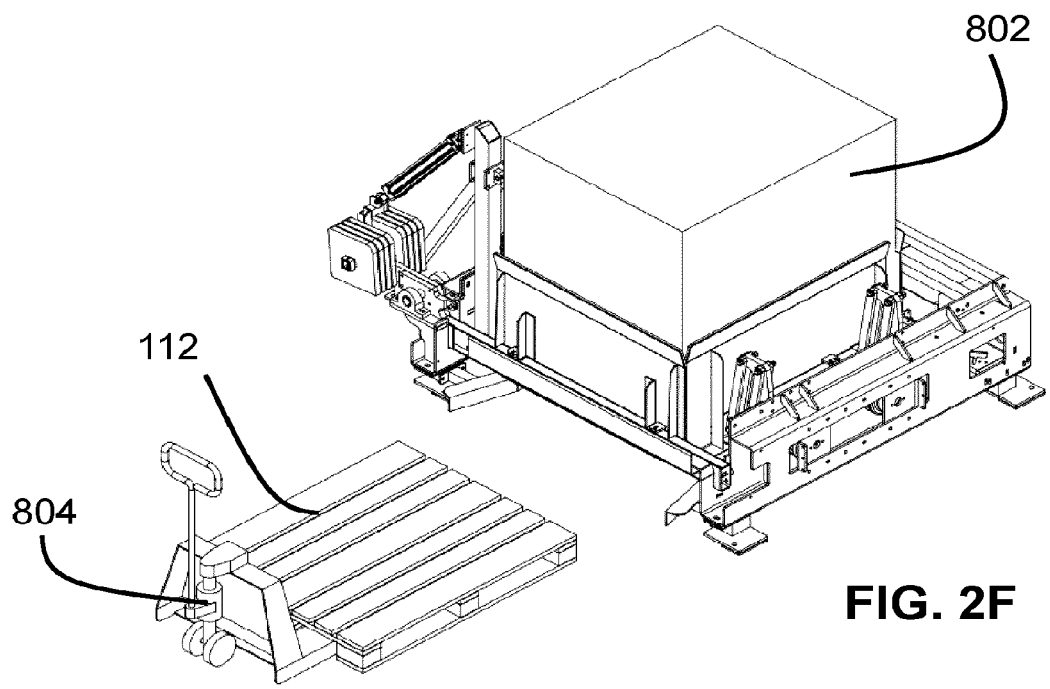
Figure 10:
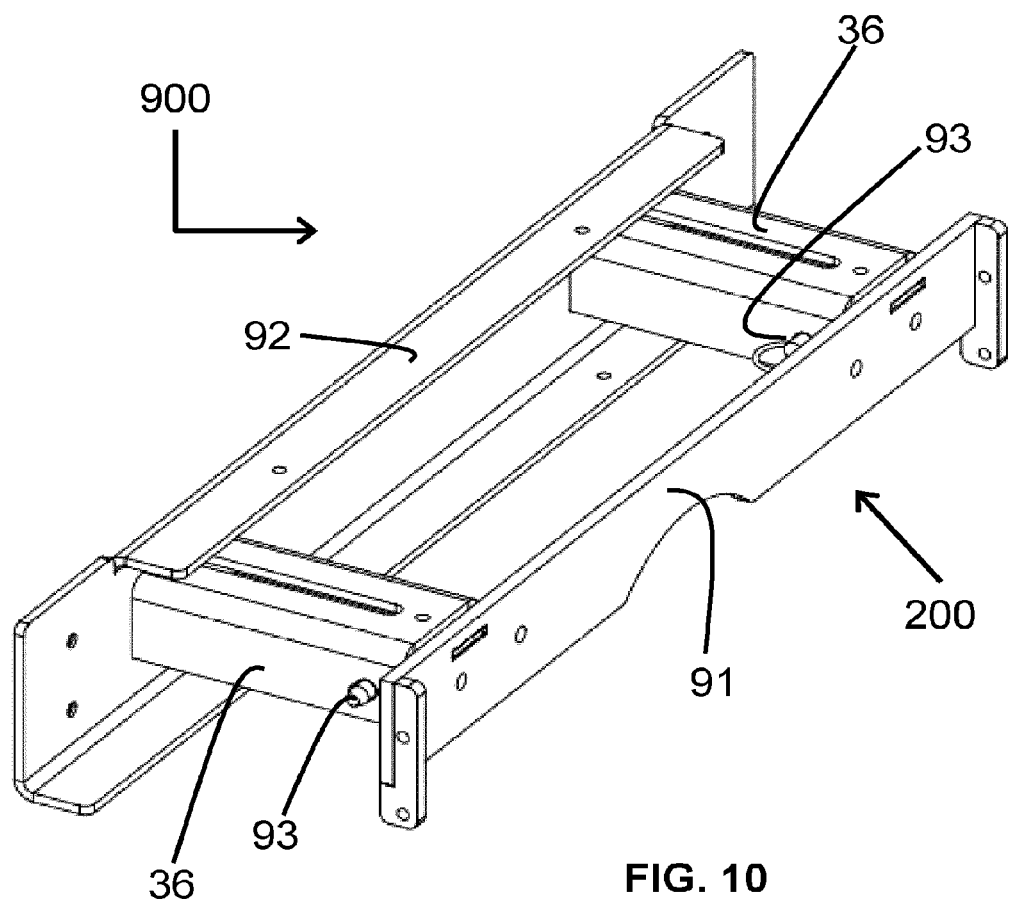
FIG. 10 (SHEET 18/19) is an isolated perspective view of an example embodiment of the adjustment assembly for the clamp assembly in a minimum adjustment state.
Figure 11:
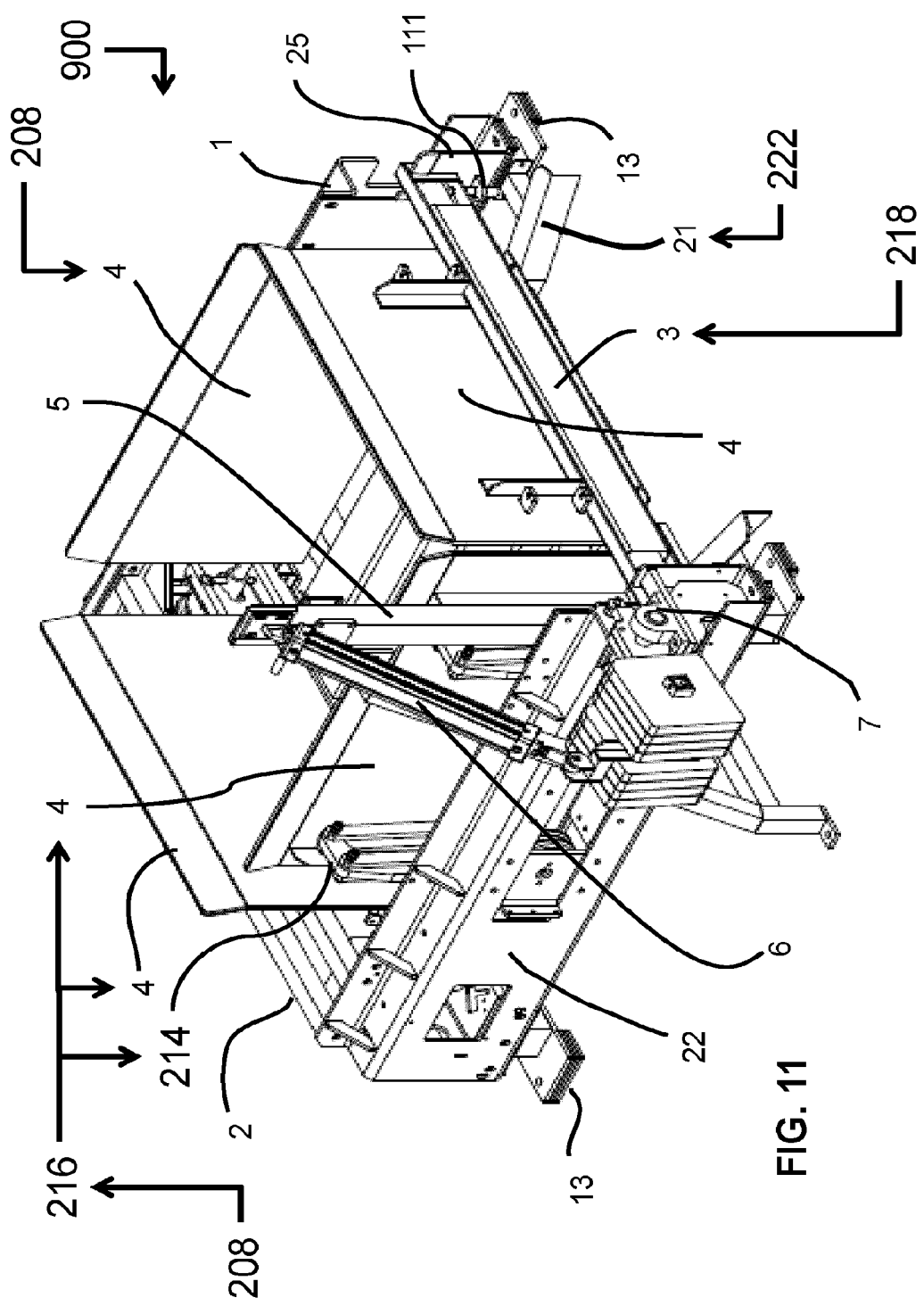
FIG. 11 (SHEET 19/19) is a perspective view of an example embodiment of the apparatus with the front gate in a closed position.

Referring to FIG. 1B, the pallet transporter (804) moves the pallet (112) having the pallet load (802) toward the pallet-receiving assembly (906) of the pallet exchanger (902) of the apparatus (900). In accordance with an option, the pallet-receiving assembly (906) may support the clamp assembly (208). As depicted in FIG. 1B, the clamp assembly (208) is configured to receive, at least in part, the pallet load (802) once the pallet (112) is received, at least in part, in the pallet-receiving zone (908). The clamp assembly (208) is also configured to apply a clamping force, at least in part, to the pallet load (802) while not applying the clamping force to the pallet (112) that is received in the pallet-receiving zone (908); this is done in such a way that the pallet (112) is removable from the pallet-receiving zone (908) without moving the pallet load (802) from the clamping zone (904) (as depicted in FIGS. 10, 2E, and 2F).

Referring to FIG. 1B, the pallet-receiving assembly (906) is configured to receive the pallet (112) supporting the pallet load (802) from the pallet transporter (804); this may be done in such a way that the pallet transporter (804) positions and continues to maintain a bottom portion of the pallet (112) proximate to a ground surface once the pallet (112) is received in the pallet-receiving assembly (906) and while the clamp assembly (208) clamps the pallet load (802). As depicted in FIGS. 1A, and 2A, the clamp assembly (208) circumscribes (at least in part) each side of the pallet load (802) from a bottom zone to a top zone of the pallet load (802). More specifically, the clamp assembly (208) has a bottom section configured to be positionable above and proximate to a top portion of the pallet (112) once the pallet transporter (804) positions a bottom portion of the pallet (112) proximate to a ground surface in the pallet-receiving assembly (906). The pallet-receiving zone (908) defines for, the pallet (112), upper and lower vertical height travel limits being limited to a marginal clearance required to move the pallet away from the pallet-receiving zone (908) plus a nominal vertical height of the pallet.

Referring to FIGS. 1C and 2E-2G, the clamp assembly (208) is configured to hold the pallet load (802) that is received in the pallet-receiving assembly (906) in such a way that the pallet (112) no longer supports the pallet load (802), and the pallet transporter (804) removes the pallet (112) without the pallet load (802) from the pallet-receiving assembly (906) while a bottom portion of the pallet (112) remains proximate to a ground surface, and while the clamp assembly (208) continues to hold the pallet load (802). Of course, it is understood that the pallet (112) may be vertically lowered and then vertically raised relative to the pallet load (802) while the pallet load (802) is clamped by the clamp assembly (208), in order to facilitate removal of an instance of the pallet (112) in FIGS. 1C, 2E and 2F with the subsequent insertion of another instance of the pallet (112) in FIGS. 1E, 2G and 2H.

Figure 1C:
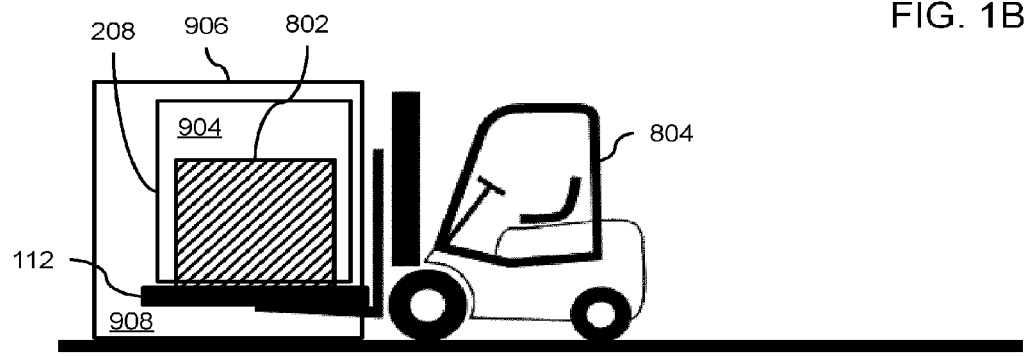

Referring to FIG. 1C (and in FIG. 1A), the clamp assembly (208) has a lower portion that is positioned proximate to a bottom-most portion of the pallet load (802) once the pallet-receiving assembly (906) receives the pallet (112) supporting the pallet load (802) from the pallet transporter (804). By way of example, the clamp assembly (208) may circumscribe, at least in part, and contact, at least in part, each side (side section) of a bottom zone the pallet load (802).

As can be seen by FIGS. 1B and 1C, the pallet-receiving zone (908) is configured to limit a range of vertical movement of the pallet (112) within the pallet-receiving zone, and the pallet-receiving zone (908) is located immediately underneath and adjacent to the clamp assembly (208). More specifically, the pallet-receiving zone (908) defines for, the pallet (112), upper and lower vertical height travel limits that are limited to a marginal (or nominal or minimal) clearance required to move the pallet away from the pallet-receiving zone (908) plus a nominal vertical height of the pallet.

Referring to FIG. 1C, the pallet transporter (804) has now positioned the pallet (112) having the pallet load (802) into the pallet-receiving assembly (906). The pallet (112) remains offset from the ground (operating surface). The clamp assembly (208) is engaged to grab (clamp) the pallet load (802) so that now the weight of the pallet load (802) is no longer being supported by the pallet (112) and/or by the pallet transporter (804). The clamp assembly (208) supports the weight of the pallet load (802) as depicted.

Figure 1D:
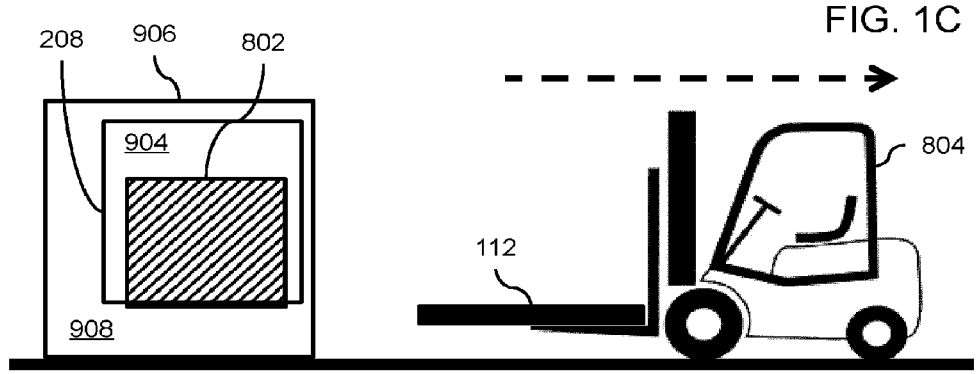

Referring to FIGS. 1D, 2E, and 2F, the pallet transporter (804) is moved away from the apparatus (900), and the pallet transporter (804) takes the pallet (112) away from the apparatus (900), while the pallet load (802) remains with the pallet-receiving assembly (906). Specifically, the clamp assembly (208) continues to grab (clamp) the pallet load (802) and maintains the pallet load (802) above the ground (the floor or the working surface).

Figure 1E:
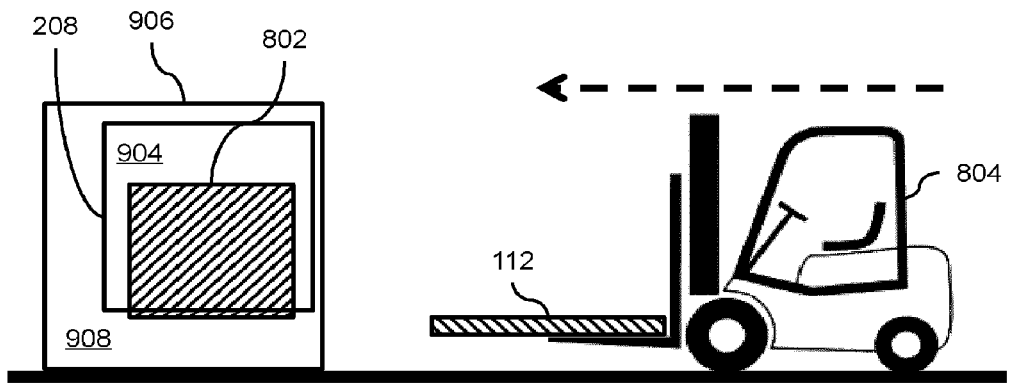
FIGS. 1E, 1F, 1G (SHEET 3/19) depict schematic representations of states of the apparatus of FIG. 1A.
Figure 2G:
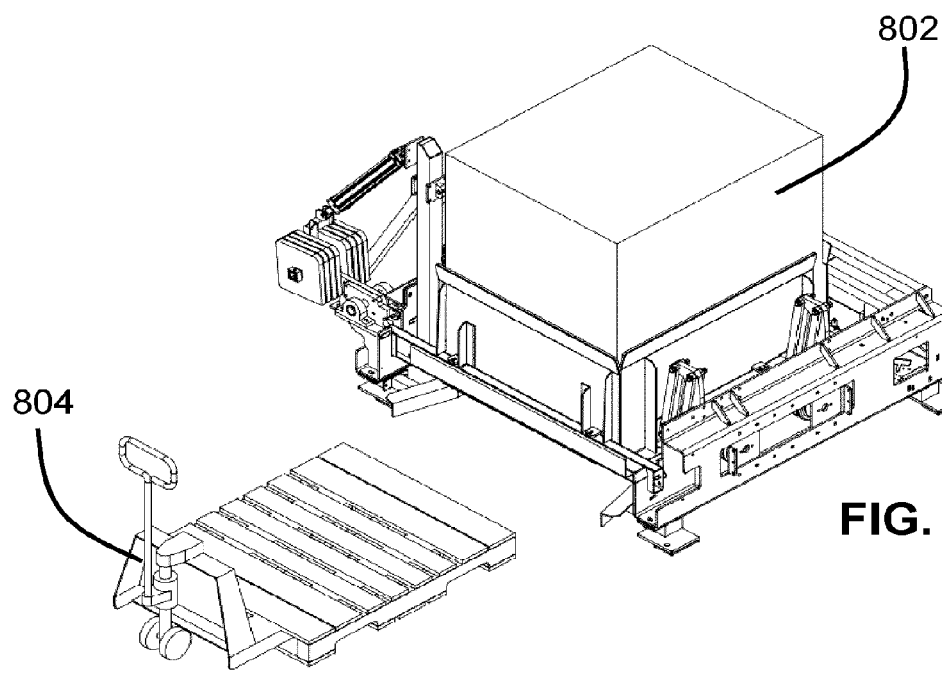
FIGS. 2G, 2H (SHEET 7/19) depict an example embodiment of the apparatus in the states shown by the schematic representations of FIGS. 1B to 1G.
Figure 2H:
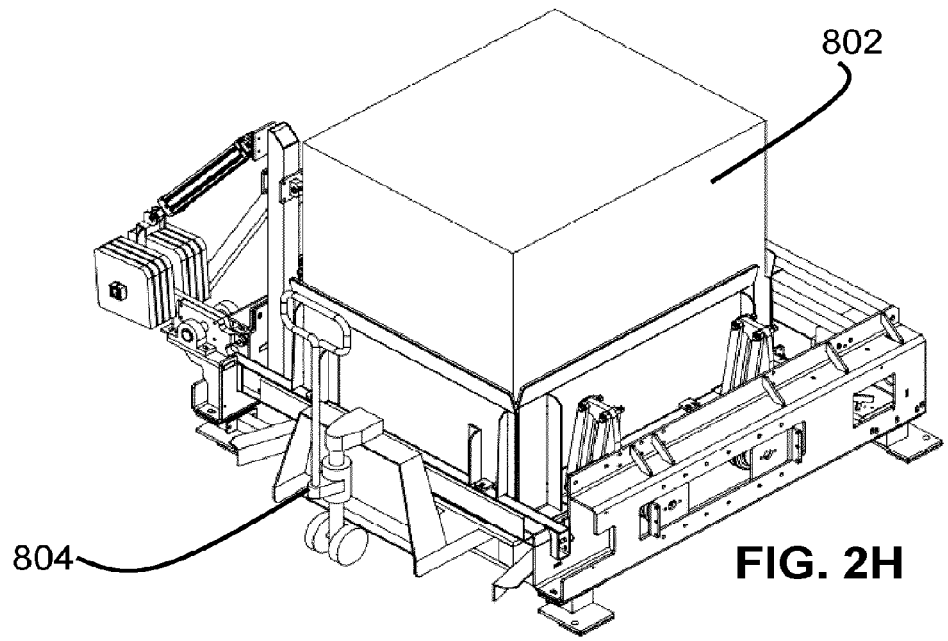

Referring to FIGS. 1E, 2G, and 2H, the instance of the pallet (112) of FIGS. 1D, 2E, and 2F, is removed from the pallet transporter (804), and a new instance of the pallet (112) is installed to the pallet transporter (804).

Figure 1F:
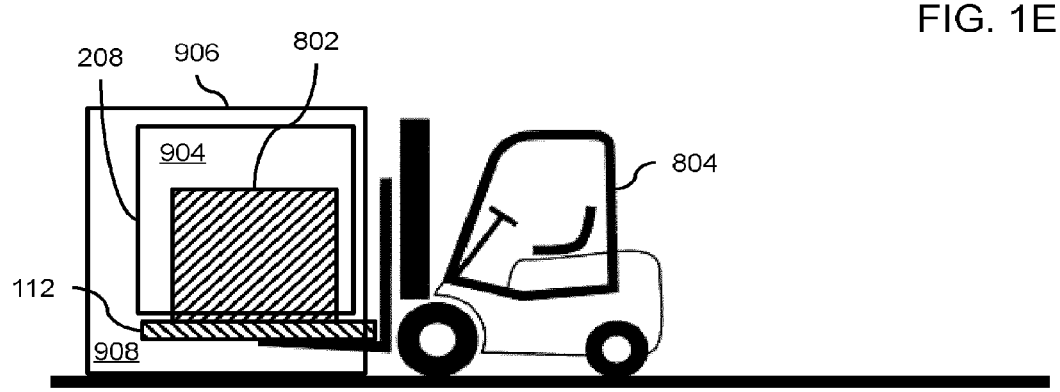
Figure 1G:
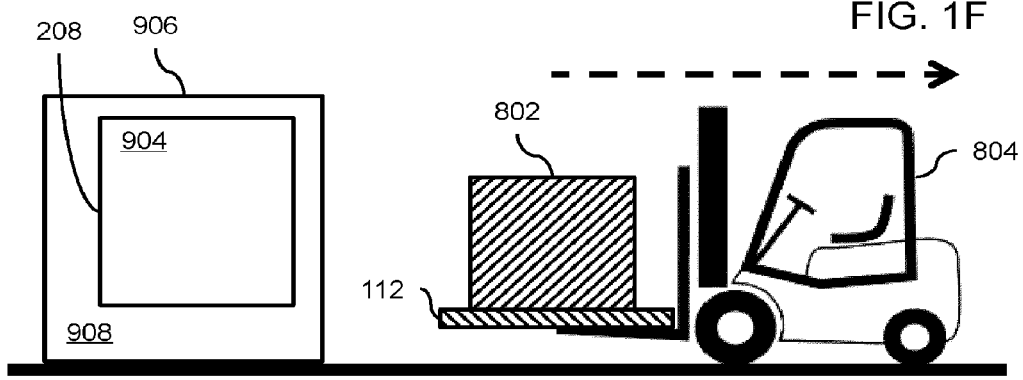
Figure 2I:
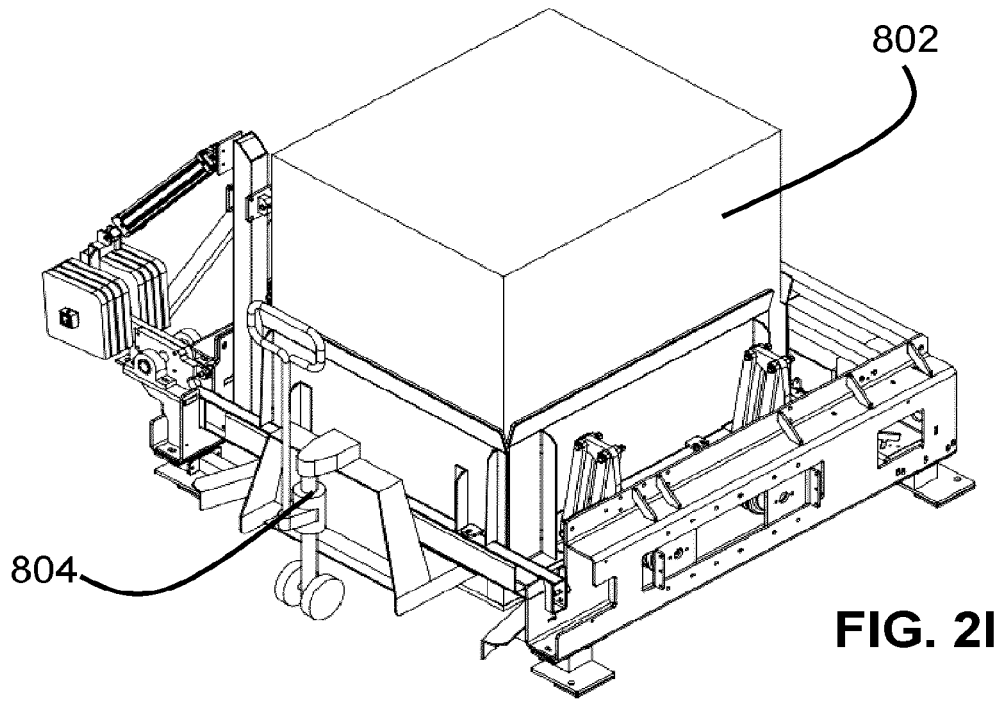
FIGS. 2I, 2J (SHEET 8/19) depict an example embodiment of the apparatus in the states shown by the schematic representations of FIGS. 1B to 1G.
Figure 2J:
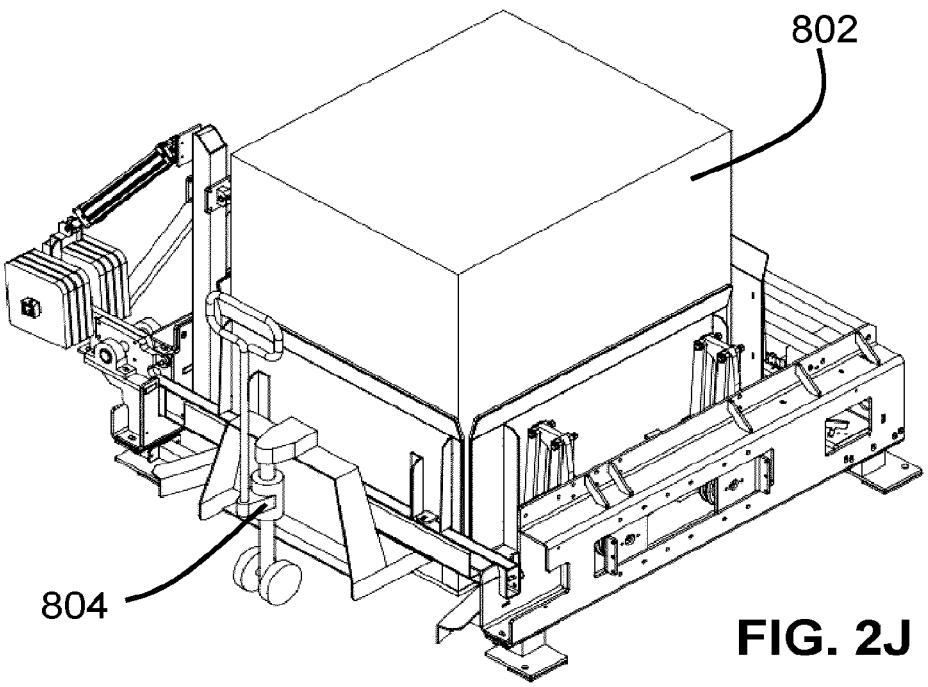
Figure 2K:
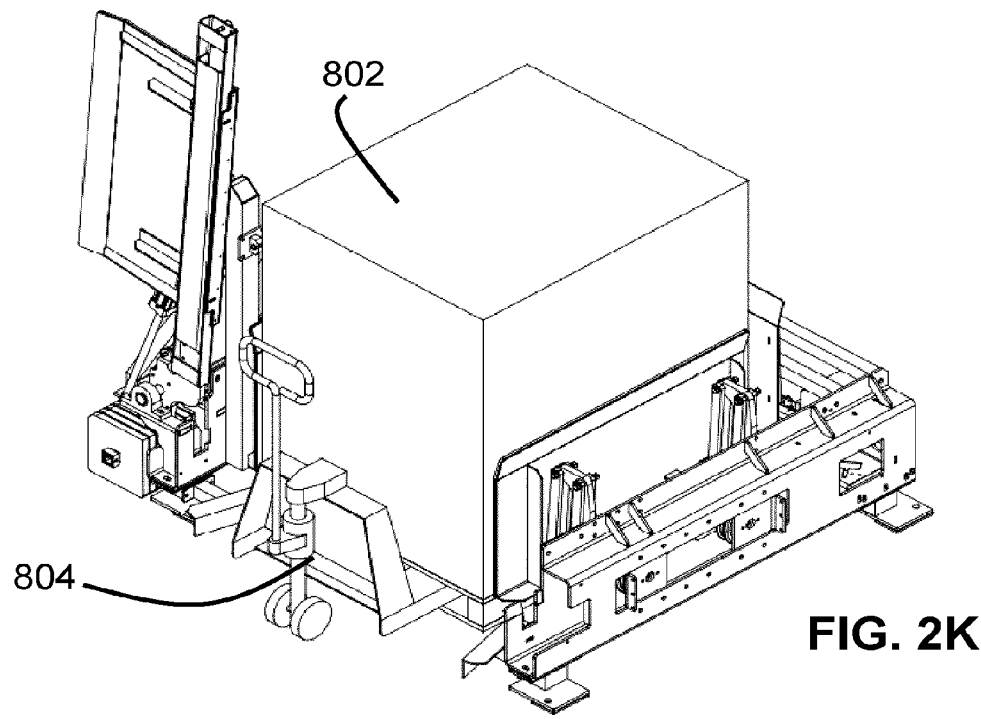
FIGS. 2K, 2L (SHEET 9/19) depict an example embodiment of the apparatus in the states shown by the schematic representations of FIGS. 1B to 1G.
Figure 2L:
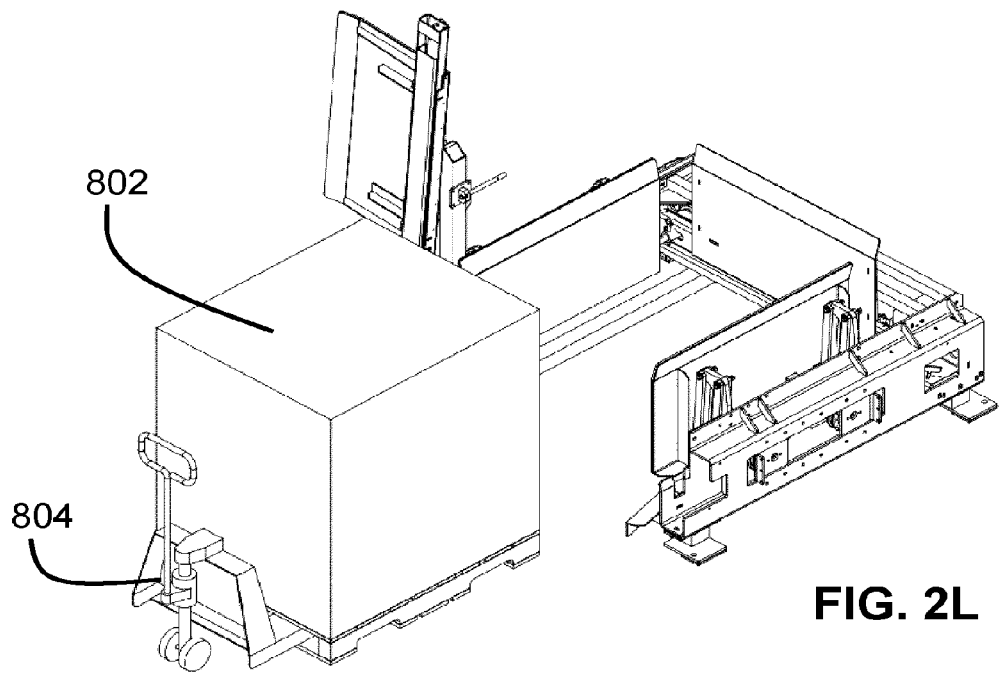

Referring to FIGS. 1F, and 2H, the pallet transporter (804) moves the pallet (112) into the pallet-receiving assembly (906) so that the pallet (112) is now positioned underneath the pallet load (802) while the clamp assembly (208) continues to grab (clamp) the pallet load (802) and to hold the pallet load (802) above the ground, as shown in FIG. 2I. Once the pallet transporter (804) positions the pallet (112) underneath the pallet load (802) being held by the clamp assembly (208), then the clamp assembly (208) releases hold of the pallet load (802), and then the weight of the pallet load (802) can be fully supported by the pallet (112) and also by the pallet transporter (804), as shown in FIG. 2J. Generally speaking, the clamp assembly (208) is further configured to release hold of the pallet load (802) being received in the pallet-receiving assembly (906). This is done in such a way that the pallet (112), being positioned in the pallet-receiving assembly (906) by the pallet transporter (804), supports the pallet load (802), and the pallet transporter (804) removes the pallet (112) supporting the pallet load (802) from the pallet-receiving assembly (906), as shown in FIGS. 2K and 2L.

Regarding FIG. 1A, the apparatus (900) is such that a front gate (3) is in a closed position. The apparatus (900) is for exchanging instances of a pallet (112). A first side frame (1) and a second side frame (not depicted in FIG. 1A but depicted in FIG. 3) are connected to a rear frame (2). In this example embodiment, the first side frame (1), second side frame (22), and rear frame (2) are connected using a nut and bolt configuration, though other connection means (such as welding, riveting, or dovetailing). In this example, using nuts and bolts to connect the frames allows the device to be disassembled for shipping. In other environments, such as in a permanent installation, however, it may be more practical to weld the frames.

A plurality of risers (13) is attached to each of the first side frame (1), the second side frame (22), and the rear frame (2). In this example embodiment, the risers (13) are bolted to their respective frame. These risers (13) provide sufficient height from an operating surface so that the pallet (not depicted in FIG. 1A but depicted in FIG. 3 and FIG. 4, etc.) may be inserted or removed from under either the front gate (3) or rear frame (2) when the apparatus (900) is in its closed position.

A rear pressure plate support (73) is slidably connected to the first side frame (1) and the second side frame (22). In this example embodiment, each end of the rear pressure plate support (73) has at least one cam roller. As shown in detail in FIG. 8, the cam rollers (74) interface with the guides (75) provided on each of the first side frame (1) and the second side frame (22). The cam rollers (74) may be called cam followers.

The first side frame (1) and the second side frame (22) in this example embodiment may be mirror images of each other. In addition to simplifying the manufacturing process, mirror imaged side frames allow the front gate (3) to be mounted on either the first side frame (1) or the second side frame (not depicted) without any additional modification to the example apparatus (900).

Referring again to FIG. 1A, a front gate (3) including a gate arm (10), and pressure plate (4) is movably connected via a pivoting assembly (7) and is shown in a closed configuration. The first side frame (1) and the second side frame (22) are configured to receive the gate arm (10) of the front gate (3).

In this example embodiment, the gate arm (10) of the front gate (3) is connected to the pivoting assembly (7) using nuts and bolts, though other connection means can be contemplated. In other embodiments, the gate arm (10) and the pivoting assembly (7) may be a single integrated unit.

In this example embodiment, the pivoting assembly (7) is supported by the second side frame (22). The pivoting assembly (7) has a counterweight (8) for reducing the force required to operate the gate. The front gate (3) has sufficient clearance from the ground or operational surface to remove and insert a pallet (not depicted in FIG. 1A but depicted in FIG. 3, etc.) when the front gate (3) is in its closed position. Furthermore, the rear frame (2) also has sufficient clearance from the ground or operational surface to remove and insert a pallet (112).

In this example embodiment, the pivoting assembly (7) includes a barrel hinge. The barrel hinge is a sectional barrel secured by a pivot. A barrel is a component of a hinge that has a hollow cylinder-shaped section where the rotational bearing force is applied to the pivot, and may also have a screw-shaped section for fastening and/or driving the pivot. A hinge is a type of bearing that connects two solid objects, typically allowing only a limited angle of rotation between them. Two objects connected by an ideal hinge rotate relative to each other about a fixed axis of rotation. Hinges may be made of flexible material or of moving components. Many joints may function as hinges. The barrel portion of the hinge is attached to the second side frame (22) while the pivot portion of the hinge is operatively connected to the gate arm (10) of the front gate (3).

In this example embodiment, the front gate (3) includes a gate arm (10) on which a pressure plate (4) is mounted. This allows for disassembly so that the device may be more easily shipped. A skilled technician would understand that the front gate (3) does not necessarily require a removable instance of the gate arm (10) and that the front gate (3) can include a single unit or any other configuration that would be practical from a shipping or usage standpoint.

Connected to the pivoting assembly (7) is an actuator (6) for opening and closing the front gate (3). In this example embodiment, the actuator (6) includes a double acting pneumatic cylinder. Other means for opening and closing the front gate (3) (such as an electric motor) can also be used.

The actuator (6) is connected to a post (5) extending from the second side frame (22). In this embodiment, an increase in air pressure causes the actuator (6) to extend. The extension of the actuator (6) causes the front gate (3) to pivot, opening the front gate (3) and allowing a pallet (112) with the pallet load (not depicted in FIG. 1A but depicted in FIG. 1B) to be placed in the apparatus (900). Decreasing the air pressure in the actuator (6) when the front gate (3) is in an open position causes the front gate (3) to move into the closed position. In this example embodiment, the actuator (6) includes a double acting pneumatic cylinder configured to act (perform) like a spring, helping to dampen and control the movement of the front gate (3) when it is transitioning into the closed position.

While the front gate (3) is in its fully opened position, a safety mechanism may be engaged to prevent the front gate (3) from closing if the actuator (6) fails. In this example embodiment, a latch (11) is provided on the post (5) so that when the front gate (3) is in its fully opened position, a bar may be slid into position so that it interferes with the closing of the front gate (3). Furthermore, the safety mechanism may be configured with a switch to prevent the operation of the device while the safety mechanism is engaged.

In its fully closed position, the front gate (3) will be received in the side frame opposite the pivot. In this example embodiment, the gate receiver (25) would be on the first side frame (1). The gate receiver (25) may include a switch for detecting whether the gate is in the closed position. Furthermore, the gate receiver (25) may also include a dampener or a receiver spring (111) (depicted in FIGS. 1A, 3, 4 and 11) to ease the front gate (3) into the gate receiver (25). The front gate (3) and corresponding instance of the pressure plate (4) must have sufficient clearance from the ground or operating surface so that a pallet (112) may pass through the bottom of the front gate (3) when the gate is in its closed position.

A pivoting gate provides a good balance between mechanical simplicity and operational footprint. A skilled person would understand that other types of gates could be used without departing from the scope of this disclosure. Examples of alternative gate systems are, without limitation, a gate that slides towards a side frame (like a sliding door), and a gate that lifts upwards (like a window), though the type of gate chosen must allow for a hand-operated pallet jack (and any equivalent thereof) to lift and lower the pallet (112). A skilled technician would also understand that because the first side frame (1) and the second side frame (22) are mirror images, the pivoting assembly (7) can be mounted on either the first or second side frame (22).

Referring now to FIGS. 1A to 7B, and 11, the clamp assembly (208) is configured to substantially circumscribe (at least in part) each side of the pallet load (802). While in operation, the instances of the clamp assembly (208) provide an inwardly directed clamping force for releasably gripping the pallet load (802). It will be appreciated that the clamp assembly 208 includes the components positioned on all four sides that are to face the pallet load of FIG. 1B. As well, it is understood that the clamp assembly (208) includes the instances of the compression assembly (216).

In the example embodiment, as shown in FIGS. 1 to 7B, and 11, the clamp assembly (208) includes a compression assembly (216). This compression assembly (216) includes four instances of the pressure plate (4). A pressure plate (4) is connected to each of the first side frame (1), the second side frame (22), the rear pressure plate support (73), the front gate (3) and to the gate arm (10). In this example embodiment, a pressure plate (4) is bolted directly to the front gate (3) and the gate arm (10) while the other instances of the pressure plate (4) are connected to their respective positions on the first side frame (1) and/or the second side frame (22), or the rear frame (2) using the structures as described and depicted in FIG. 4 to FIG. 8. A skilled technician would understand that the pressure plates can all be the same size or of different sizes, though it would be understood that the plates must not interfere with each other while the clamp assembly (208) has been activated. For example, different sized side plates may be used in an environment where the typical instance of the pallet load (802) is more rectangular in shape.

Figure 7A:
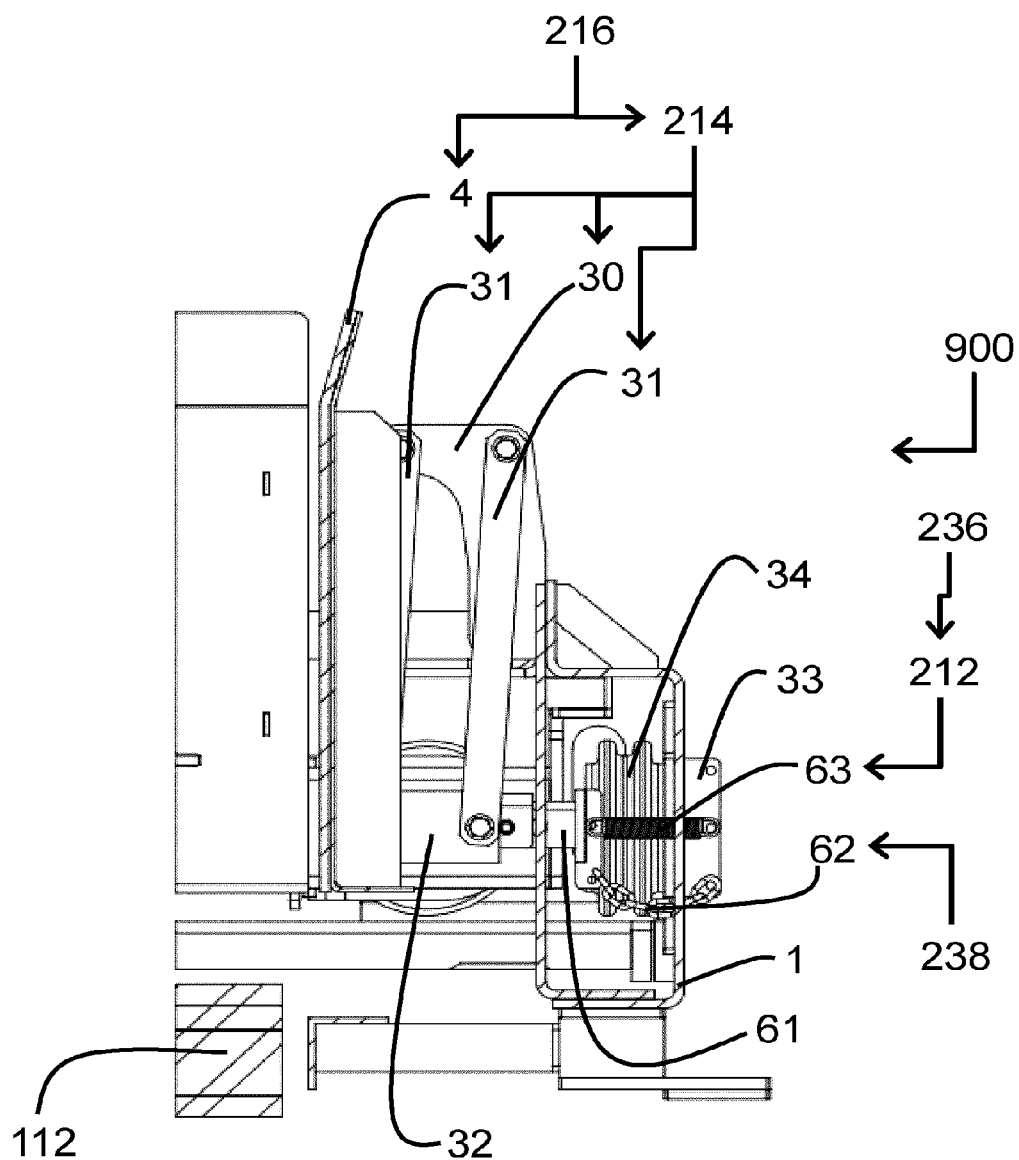
FIG. 7A (SHEET 14/19) is a close-up view of the side compression mechanism of an example embodiment of the apparatus.
Figure 7B:
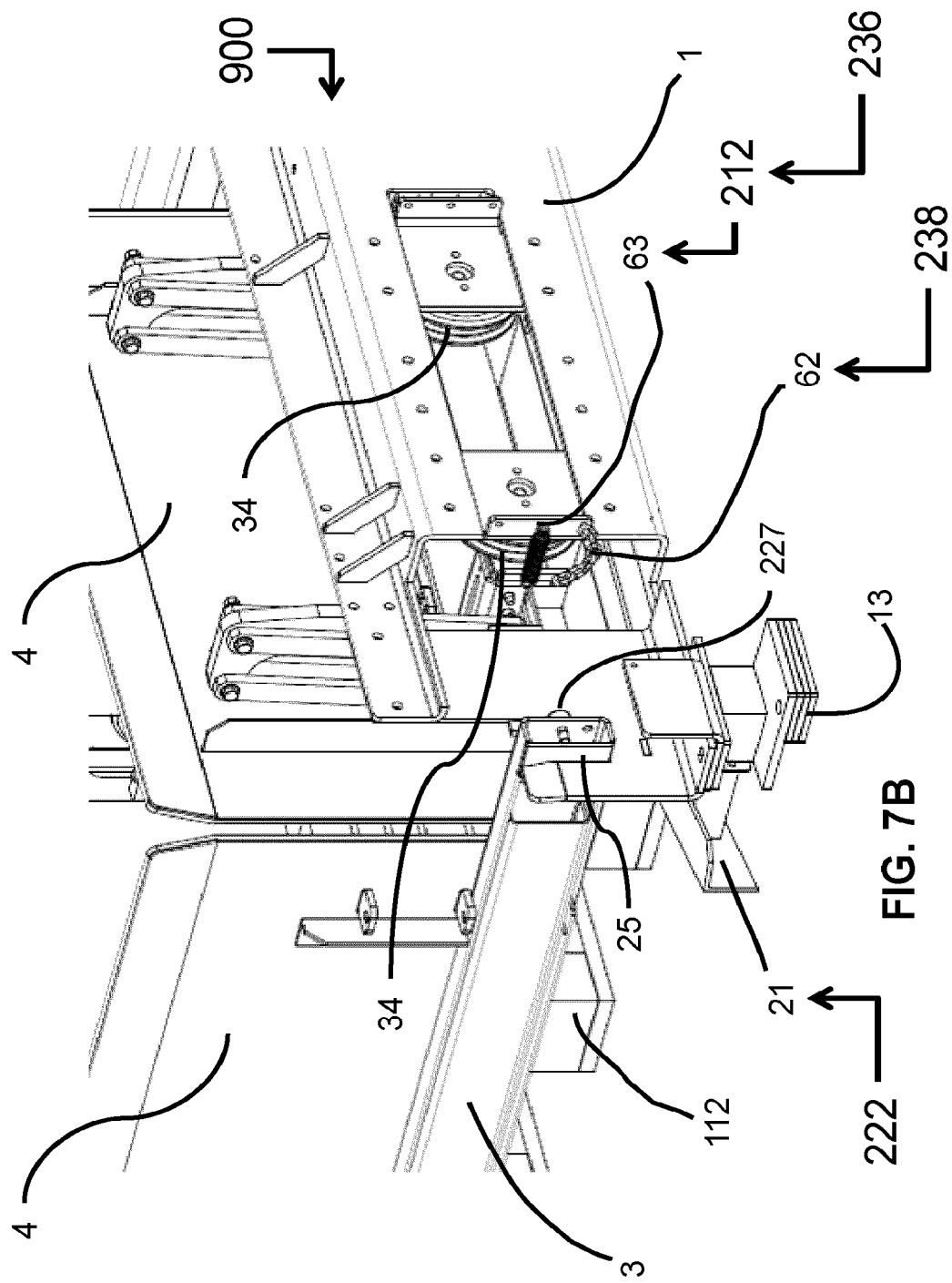
FIG. 7B (SHEET 15/19) is a close-up perspective view of the side compression mechanism of an example embodiment of the apparatus.
Figure 8:
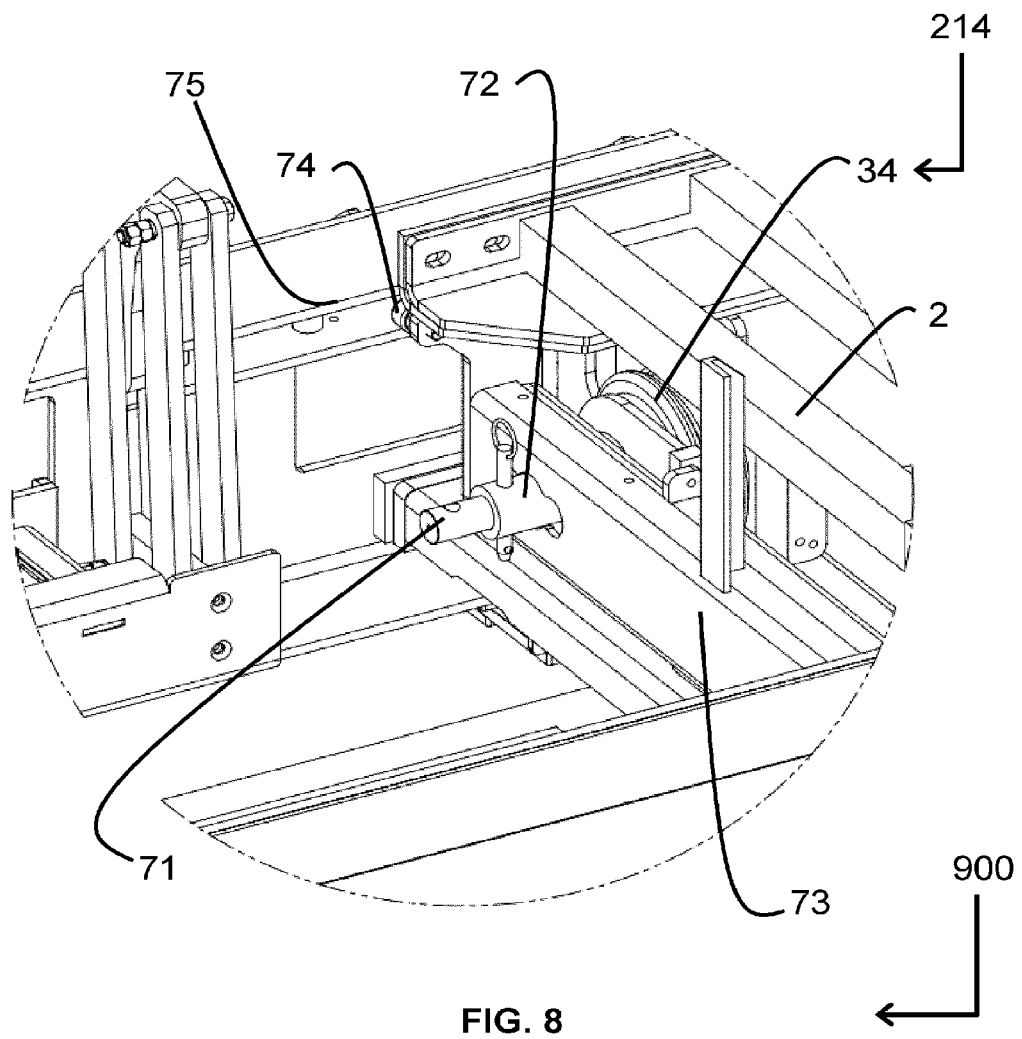
FIG. 8 (SHEET 16/19) is a close-up view of the rear compression mechanism of an example embodiment of the apparatus.

An extension assembly (214), depicted in FIG. 8, is provided on the first side frame (1), second side frame (22) and rear frame (2). The extension assembly (214) is used to generate an inwardly directed clamping force for releasably gripping the pallet load (802). In the example embodiment, the extension assembly (214) includes airbags provided on each of the first side frame (1), second side frame (22), and rear frame (2). The operation of the airbags is described in FIGS. 4 to 8.

In this example embodiment, the load-facing surface of the instances of the pressure plate (4) are coated with a rubberized foam (or polyurethane coating) that allows the instances of the pressure plate (4) to frictionally grip the pallet load (802) as the actuators are activated. For example, in a beverage distribution depot, a urethane coating of about 50 to about 60 durometer would be suitable for handling pallet loads typical for such an environment. A skilled technician will understand that other methods for frictionally gripping the pallet load (802) (e.g., the use of other suitable materials, a textured surface, a textured coating, etc.) can be used without departing from the scope of this disclosure.

Furthermore, in this example embodiment, the instances of the pressure plate (4) each include outwardly diverging sloping wall portions (12), as depicted in FIG. 1A, configured to prevent snagging the cases when the pallet (112) and the pallet load (802) are raised and particularly when the pallet (112) and the pallet load (802) are lowered. Without such an accommodation, any misaligned cases in pallet load (802) could be snagged and consequently damaged by the free edges of the pressure plates. This possibility is obviated as a result of the outwardly diverging sloping wall portions (12).

Figure 3:
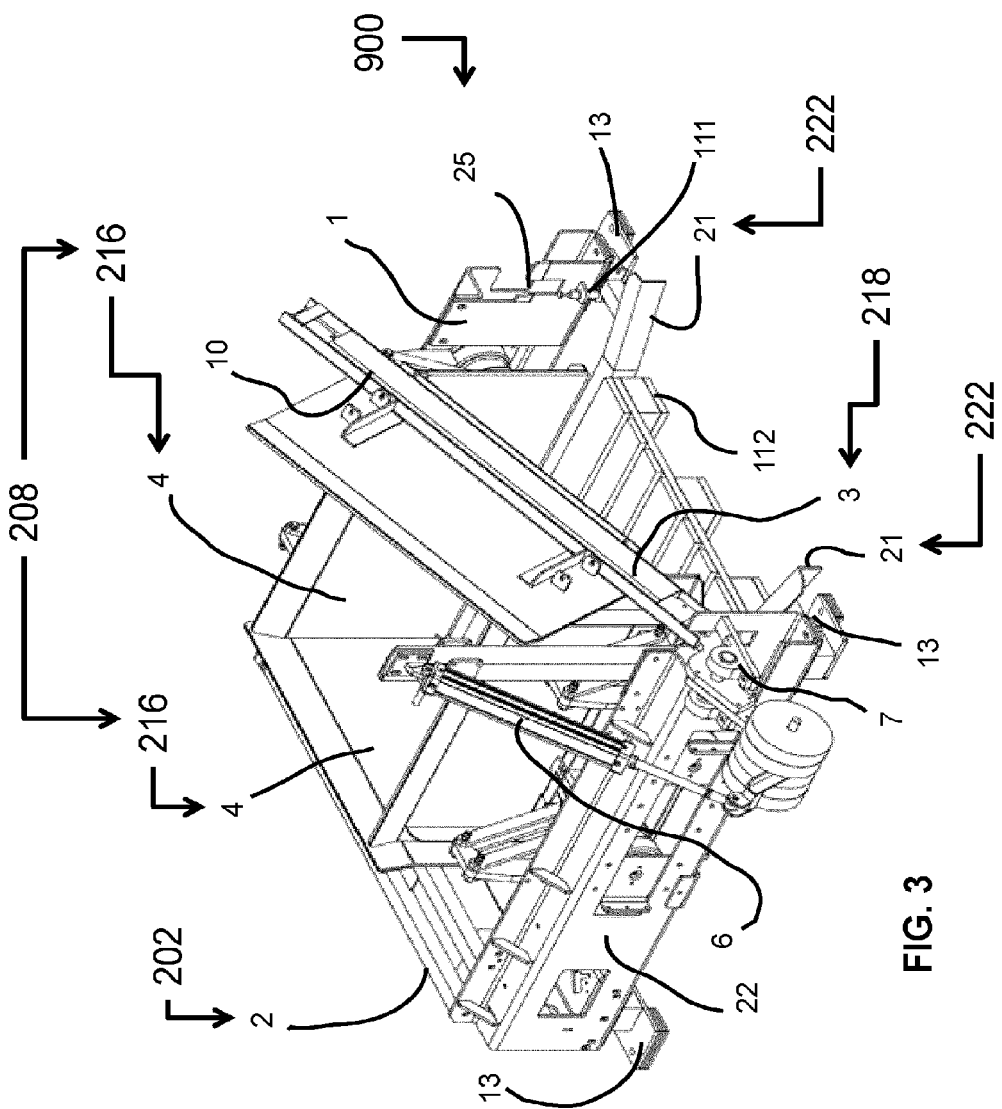
FIG. 3 (SHEET 10/19) is a perspective view of an example embodiment of the apparatus with the front gate in mid travel.

Referring now to FIG. 3, an embodiment of the device is shown with the front gate (3) in transition and one side compression mechanism and the rear compression mechanism partially activated. It should be noted that the partial activation as shown in FIG. 3 is for illustrative purposes only and does not necessarily describe a valid operational or transitional position of the device. For instance, in actual operation, an operator should not be able to lift the gate while the compression mechanism is activated for safety reasons.

As is shown in FIG. 3, the front gate (3) is partially raised from its closed position. As was discussed above, as the actuator (6) (which may be a double acting cylinder actuator) is activated, a substantially downward force is exerted on the pivoting assembly (7) causing the front gate (3) to rotate around the pivoting assembly (7). In the case of the front gate (3) being raised, the front gate (3) and the gate arm (10) rise from its gate receiver (25), which is depicted in FIG. 3, in the first side frame (1) to a final open position where the front gate (3) does not obstruct a pallet (112) and the pallet load (802) from being placed into or removed from the device.

As the actuator (6) is deactivated and fluid pressure is released, gravity causes the front gate (3) to move from an open position to a closed position. The gradual pressure release from the actuator (6), which may be a double acting cylinder, helps to dampen the movement of the front gate (3) into the closed position, preventing a rapid and uncontrolled closure.

The locking assembly can also be provided to secure the front gate (3) when the front gate (3) is in its closed position, and is also provided to resist the tendency of the side frames to spread when the clamp assembly (208) has been activated. In this example embodiment, the front gate (3) has a cam (41) (depicted in FIG. 5) welded perpendicularly to the front gate (3). When the gate arm (10) of the front gate (3) is resting in the gate receiver (25) in the first side frame (1), the cam (41) engages with the first side frame (1) to secure the front gate (3) and also to improve the structural rigidity of the device by resisting lateral movement of the side frames upon compression of the side clamps. This cam (41) resists the tendency of the frame to spread due to reactive forces when the clamp assembly (208) is operating on the pallet load (802). A skilled person would understand that other structures and solutions for resisting the tendency of the frame to spread due to reactive forces when the clamp assembly (208) is in operation can be used without departing from the scope of this disclosure. For example, a cam follower (depicted) can be used instead of the cam (41), thereby reducing the frictional forces for engaging the lock as compared to the cam (41) described above. Another example would be to provide a gate receiver (25) in the gate arm (10) for a removable cotter pin.

Guide rails (21) for positioning the pallet (112) and the pallet load (802) in the device are shown in FIG. 3. These guide rails (21) are used to assist a user in positioning the pallet (112) and the pallet load (802), so that each side of the pallet load (802) is circumscribed (at least in part) by the clamp assembly (208). These rails may be affixed, for example, to the first side frame (1) and the second side frame (22), the risers (13), or the ground.

In this example embodiment, the guide rails (21) have outwardly sloping portions that slope towards the first side frame (1) and the second side frame (22). As a misaligned instance of the pallet (112) is moved into the apparatus (900), it will be gradually positioned so that, while in operation, each side of the pallet load (802) is substantially circumscribed (at least in part) by the clamp assembly (208). A rear rail (not shown) may optionally also be used to indicate to an operator that the pallet load (802) has been correctly positioned.

For safety and reliability reasons, sensors or switches (not shown) may be equipped for preventing the operation of the device if certain conditions are not met. For example, a mechanical switch for disabling the apparatus (900) can be installed along the guide rail to prevent the operation of the device if a pallet (112) and the pallet load (802) are not present. Additionally, a mechanical switch may also be installed on the front gate (3) or the gate receiver (25) may be used to disable the device if the front gate (3) is not in a closed position. A skilled person in the art would understand that alternatives to mechanical switches, such as optical or electrical switches, or a safety button that the user may have to press and hold to operate the device can be used without departing from the scope of the disclosure.

Figure 4:
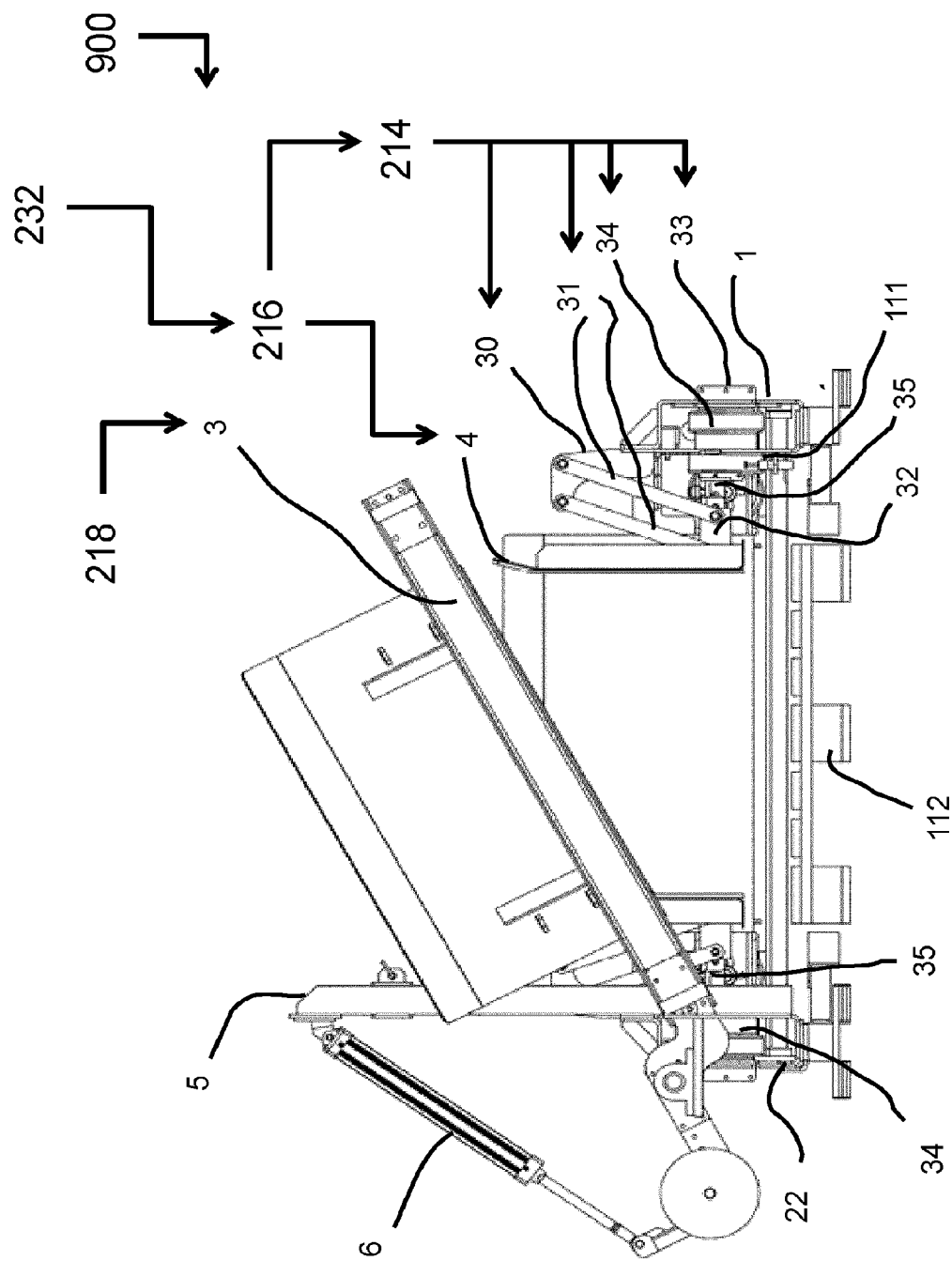
FIG. 4 (SHEET 11/19) is a front-facing view of an example embodiment of the apparatus with the front gate in mid travel.
Figure 6:
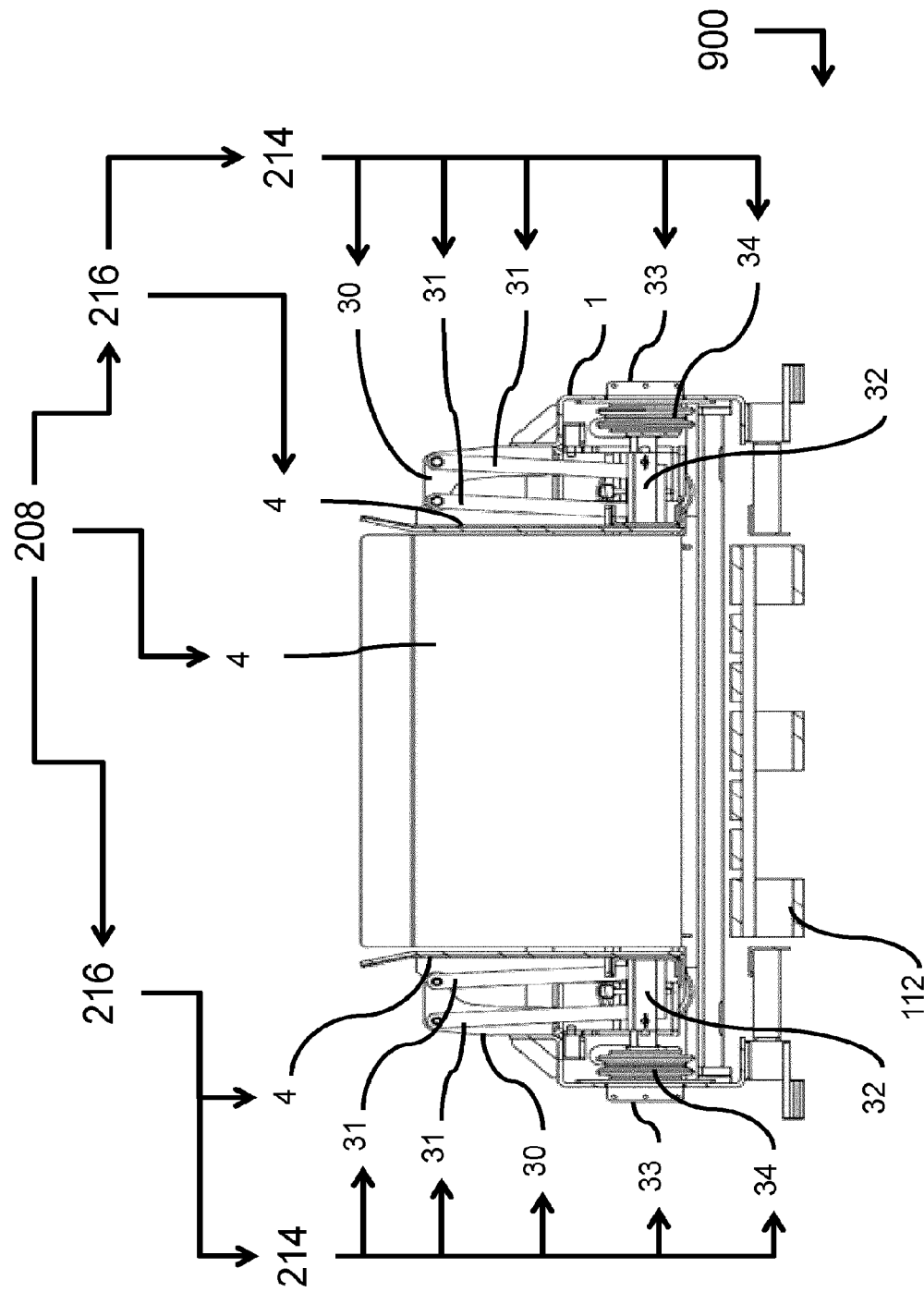
FIG. 6 (SHEET 13/19) is a cross-sectional view of an example embodiment of the apparatus.

FIG. 4 is a front view of the apparatus (900) as shown in FIG. 3, with a clearer view of the side compression assembly (232) attached to the first side frame (1) in an extended position. A similar side instance of the compression assembly (216) (not shown in FIG. 4) is mirrored on the second side frame (22). Referring now to FIG. 4 and FIG. 6, in this example embodiment, a support member (30) is bolted to the first side frame (1). In other embodiments, the support member (30) may be welded, riveted, or affixed by some other means.

Two movable arms (31), each having two ends, are hingedly connected to the support member (30) at one end and hingedly connected to a plate arm (32) extending substantially perpendicularly from the pressure plate (4) at the other end.

Sufficient supports (as described above) should be employed to support the weight of the pressure plate (4) and any pallet load that may be loaded into the apparatus (900). In this example embodiment, two support structures as described above are used on each side frame in order to support the pressure plate (4) and any pallet load that may be used in the apparatus (900). A skilled person would understand that fewer or more support structures, or different support structures, may be used depending on the application.

Attached to the first side frame (1) is an extension assembly (214) (depicted in FIGS. 7A, 8) for generating an inwardly directed clamping force. In this example, the extension assembly (214) includes an airbag (34), and an inflating assembly (33) (depicted in FIG. 4) configured to inflate an airbag (34). In this example embodiment, the instances of the airbag (34) are shown as resilient cylinders having pleated side walls which are adapted to extend flexibly along the longitudinal axis of the cylinder. One end of the airbag (34) is connected to the first side frame (1) (depicted in FIG. 4) via the inflating assembly (33). In this example embodiment, the inflating assembly (33) includes a header (not depicted) attached to a compressed air source through a network of pneumatic hoses, valves, and couplers.

The other end of the airbag (34) includes an air-bag connection member (35) (depicted in FIG. 4) for connecting to the pressure plate (4) (depicted in FIG. 4) at the corresponding instance of the pressure-plate connection member (36) (depicted in FIGS. 9 and 10) of the pressure plate (4). In this example embodiment, the air-bag connection member (35) of the airbag (34) is fabricated from tubing of square cross-section and is mounted in-line with the longitudinal axis of the cylinder. Furthermore, the air-bag connection member (35) can slidably fit inside the corresponding instance of the pressure-plate connection member (36). In this case, the corresponding instance of the pressure-plate connection member (36) is fabricated from tubing of the square cross-section that is of slightly greater diameter than the tubing used on the airbag (34). Furthermore, the pressure-plate connection member (36) is mounted perpendicularly to pressure plate (4).

As the inflating assembly (33) causes the airbag (34) to inflate, a force is exerted on the pressure plate (4), thereby creating an inwardly directed clamping force. In this example embodiment, each of the two support structures (as described above) has a corresponding instance of the compression assembly (216) (depicted in FIGS. 6 and 7A).

Figure 9:
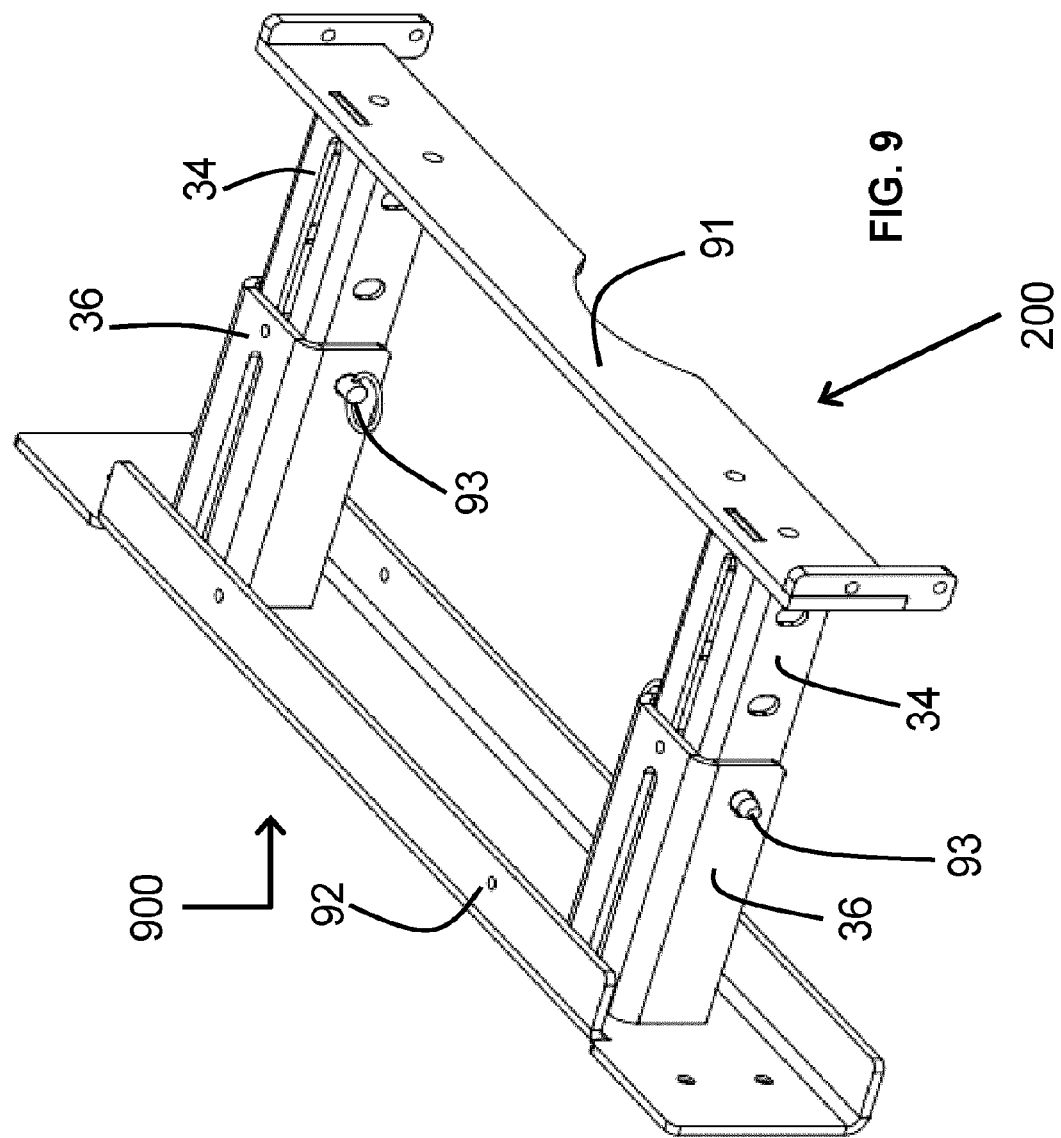
FIG. 9 (SHEET 17/19) is an isolated perspective view of an example embodiment of the adjustment assembly for a clamp assembly in a maximum adjustment state.

In the example embodiment, the two airbags are connected via an air-bag linkage (91) (as shown in FIG. 9 and FIG. 10). This air-bag linkage (91) helps to keep the pressure plate (4) relatively parallel to the side frame while the airbags are being inflated even if the airbags are being inflated at different rates. The air-bag linkage (91), for example, can be a metal bar welded to the connection members of each of the two airbags.

Similarly, the two instances of the pressure-plate connection member (36) (depicted in FIGS. 9 and 10) on the pressure plate (4) (depicted in FIG. 1A) are connected via a plate-linkage (92) (depicted in FIG. 9 and FIG. 10). The plate-linkage (92) helps to distribute the compressive forces generated by the instances of the airbag (34) across the pressure plate (4) while also keeping the pressure plate (4) relatively parallel to the first side frame (1) and/or the second side frame (22) while the instances of the airbag (34) are being inflated. The plate-linkage (92), for example, may be a metal bar welded to the instances of the pressure-plate connection member (36) on the pressure plate (4) corresponding to each of the two instances of the airbag (34).

In the example embodiment provided, the instances of the air-bag connection member (35) (depicted in FIG. 4) on the instance of the airbag (34), and the corresponding instances of the pressure-plate connection member (36) on the pressure plate (4) are adjustable so that the pressure plate (4) can be positioned closer to, or away from, the center of the device. For example, positioning the instances of the pressure plate (4) closer to the center of the device reduces the distance the pressure plate (4) must travel in order to secure smaller instances of the pallet load (802).

In this example embodiment, the adjustment assembly (200) (depicted in FIG. 9 and FIG. 10) consists of corresponding holes for receiving a cotter pin (93) on the air-bag connection member (35) of the airbag (34) and the pressure-plate connection member (36) of the pressure plate (4). As was discussed above, the air-bag connection member (35) of the airbag (34) can slidably fit inside the pressure-plate connection member (36) of the pressure plate (4). In order to adjust the pressure plate (4) so that it is closer to pallet load (802), a user can remove the cotter pin (93) (depicted in FIG. 9 and FIG. 10), position the pressure plate (4) towards the center of the apparatus (900), and replace the cotter pin (93) so that the pin is received by the corresponding holes in the air-bag connection member (35) of the airbag (34) and the pressure-plate connection member (36) of the pressure plate (4).

An isolated view of the example of the adjustment assembly (200) for the clamp assembly (208) (depicted in FIGS. 3, 6 and 7A) is provided in FIG. 9 and FIG. 10. As was discussed above, the air-bag connection member (35) of the airbag (34) can slidably engage with the pressure-plate connection member (36) of the pressure plate (4). FIG. 9 shows the adjustment assembly (200) in its maximum adjustment state, while FIG. 10 shows the adjustment assembly (200) in its minimum adjustment state. The cotter pin (93) is fitted in the corresponding holes in the air-bag connection member (35) of the airbag (34) and the pressure-plate connection member (36) of the pressure plate (4) so that the distance of the pressure plate (4) from the pallet load (802) can be adjusted. Other structural elements could be used interchangeably as adjustable connection members. For instance, the adjustable connection members for the airbag (34) and the pressure plate (4) may be fabricated out of a channel (without departing from the scope of the disclosure).

The side compression mechanism as described above is configured so it does not interfere with the loading and unloading of the device when the front gate (3) is in an opened position. Furthermore, the side instance of the clamp assembly (208) is configured so that, while in operation, it does not interfere with the replacement of a pallet (112), as shown in FIG. 6.

Figure 5:
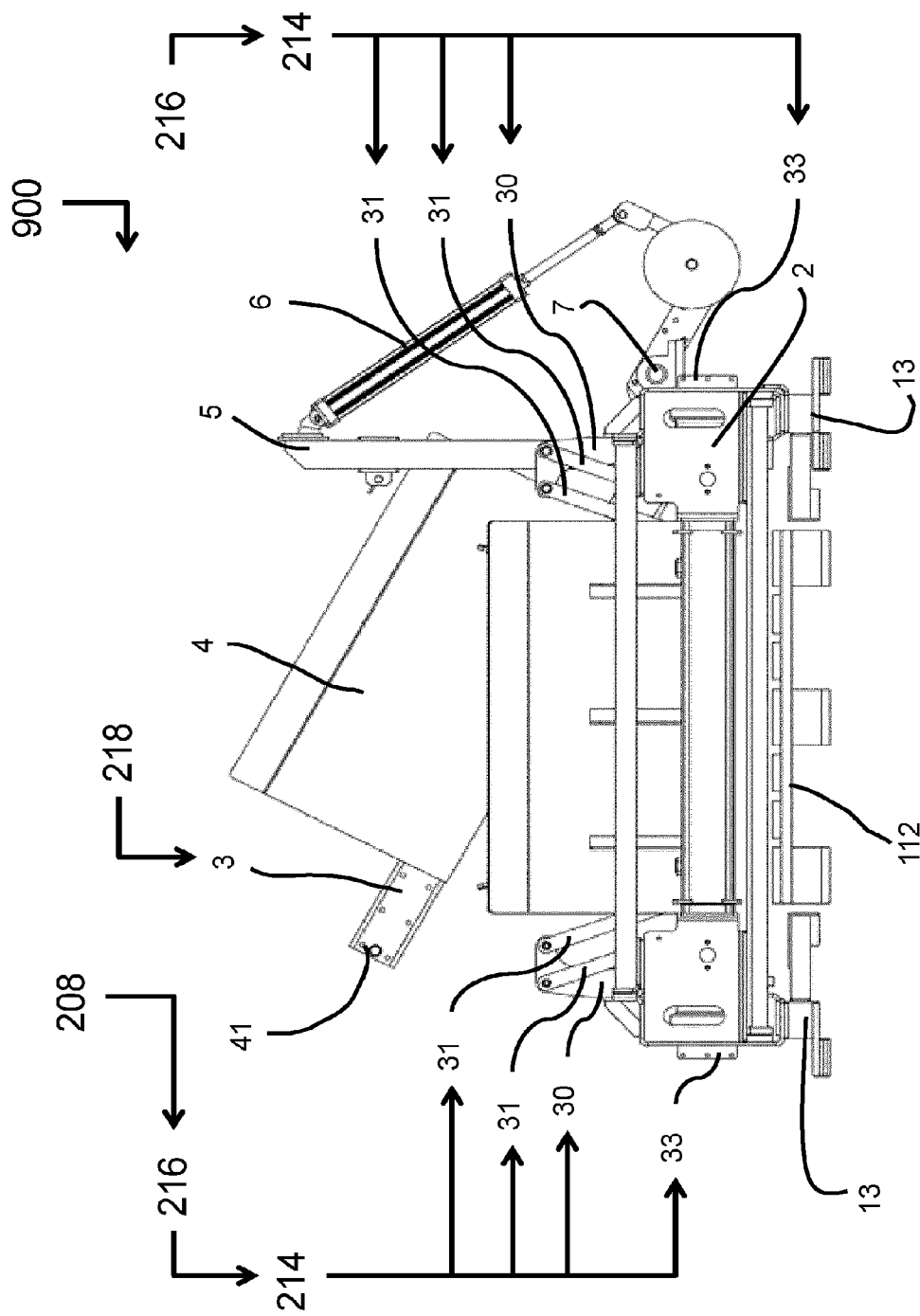
FIG. 5 (SHEET 12/19) is a rear-facing view of an example embodiment of the apparatus with the front gate in mid travel.

Referring now to FIG. 5, the rear frame (2), side compression mechanisms, and rear compression mechanism are configured so that a pallet (112) may pass through the front or rear of the device when the device is in operation. In the example embodiment shown in FIG. 5, the risers (13) provide sufficient clearance between the ground (or, alternatively, operating surface such as gravity rollers) and the bottom of the rear frame (2) so that a pallet (112) may pass through the rear frame (2).

Referring now to FIG. 7A and FIG. 7B, there is depicted the example embodiment, in which a means for limiting the travel of the airbag (34) when the airbag (34) is provided for the case where the airbag (34) is inflated. Limiting the travel of the airbag (34) protects the airbag (34) from damage due to overextension or over-pressurization. In the example embodiment provided, the travel-limiting assembly (238) includes a chain (62) (depicted in FIGS. 7A and 7B) attached, at one end, to the first side frame (1) and, at the other end, to the linkage (61) connecting the two instances of the airbag (34).

Referring again to FIG. 7A and FIG. 7B, a means for assisting the deflation of the airbag (34) (not depicted in FIG. 7B) is also provided. Providing a means for assisting the deflation of the airbag (34) speeds up the deflation of the airbag (34), thereby helping to retract the pressure plate (4) from the pallet load (not depicted in FIG. 7A and FIG. 7B). This can improve the cycle time of the apparatus (900). In the example embodiment provided, a deflation assembly (212) configured to assist deflation of the airbag (34) is an air-bag spring (63) connected, at one end, to the first side frame (1) and, at the other end, to the linkage (61) connecting the two instances of the airbag (34). In the fully inflated position of the airbag (34), the air-bag spring (63) is fully extended. As the airbag (34) is deflated, the air-bag spring (63) exerts a force, outwardly directed relative to pallet load (802), helping to retract the pressure plate (4).

In this example embodiment, each airbag (34) is configured with its own instance of a travel-limiting assembly (238) and the deflation assembly (212) for assisting the deflation of the airbag (34). A skilled technician would understand that alternative means for limiting travel and assisting retraction can be used without departing from the scope of this disclosure.

Referring now to FIG. 8, a close up partial view of the rear compression mechanism is provided. Attached to the rear frame (2) is an extension assembly (214) for generating an inwardly directed clamping force. In this example embodiment, the extension assembly (214) includes an airbag (34) and an inflating assembly (33) (not depicted in FIG. 8) configured to inflate an airbag (34) similar to the one employed in the side compression mechanism. One end of the airbag (34) is connected to the rear frame (2) via the inflating assembly (33). In this example embodiment, the inflating assembly (33) includes a header (not depicted) attached to a compressed air source through a network of pneumatic hoses, valves, and couplers.

The other end of the airbag (34) includes an adjustable connection member (not depicted) for slidably connecting to a corresponding instance of a support connection member (not depicted) of the rear instance of the pressure plate (4) (not depicted in FIG. 8). In this example embodiment, the support connection member (not depicted) of the rear instance of the pressure plate (4) includes a female connection member tube (72) that is configured to receive a corresponding instance of an adjustable male connection member rod (71), and the adjustable male connection member rod (71) is attached to the airbag (34).

The rear pressure plate support (73) is also slidably connected to each of the first side frame (1) (depicted in FIG. 1A) and the second side frame (22) (depicted in FIG. 3). In this example embodiment, each end of the rear pressure plate support (73) is configured with the cam rollers (74) that interface with a track, or the guides (75), on each of the respective first side frame (1) and the second side frame (22).

The slidable instance of the rear pressure plate support (73), in combination with the female connection member tube (72) on the rear pressure plate support (73), the adjustable male connection member rod (71) of the airbag (34), and the quick release pin (76), allow the rear instances of the pressure plate (4) to be adjusted towards or away from the pallet load (802).

A travel-limiting assembly (238) (depicted in FIGS. 7A and 7B) is configured to limit the travel of the rear instance of the airbag (34). In this example embodiment, the travel-limiting assembly (238) includes a chain (62) attached at one end to the rear frame (2) and at the other end of the base of the adjustable male connection member rod (71) of the airbag (34).

Likewise, the deflation assembly (212) (depicted in FIG. 7A and FIG. 7B) for assisting the deflation of the rear instance of the airbag (34) is also provided. In this example embodiment, the deflation assembly (212) includes a spring attached at one end of the rear frame (2) and at the other end of the adjustable male connection member rod (71) of the airbag (34).

In the example embodiment described above, a pneumatic system is used to energize the system. Each airbag (34) in the system is connected to the pneumatic system via headers, and the headers are connected to a compressed air source via tubing, hoses, valves, dampeners, mufflers, distributors, and connectors. A skilled person would understand that the amount of air pressure required to operate the system will depend on the type of pneumatic system used and the robustness of the pallet load (802) being operated on. In this example embodiment, the compressed air source should be capable of providing at least 20 psi (pounds per square inch) of pressure. When operating on various types of the pallet loads such as beverages, the example embodiment described above is typically operated between about 45 to about 55 psi.

In an example embodiment of the pneumatic system, pneumatic logic is used to determine the operation of the device and its respective timings. Other means to control the compression assembly (216) (depicted in FIG. 6 and FIG. 7A), such as a programmable logic controller, can also be used.

Furthermore, the amount of pressure used in the system is controllable by the operator. This allows the operator to adjust the clamping force of the apparatus (900) according to the characteristics of the pallet load (802) being operated upon.

A skilled person in the art would understand that other solutions for energizing the device can be used without departing from the scope of this disclosure. For example, a hydraulic system may be used to actuate hydraulic pistons or fluid-filled sacs. Another possible embodiment could use electric motors such as "screw-type drives" to actuate the pressure plates, thereby providing an inwardly directed force. However, a pneumatic system is preferred for safety, hygiene, avoidance of contamination due to oil leakage, and cost advantage. The considerations of hygiene and contamination are important in food handling and pharmaceutical environments, and in these environments a pneumatic system is preferred.

In another example embodiment, a programmable logic controller (PLC) may be used to manage the operation of the device and the pneumatic control system. In another example embodiment, the PLC, in concert with one or more sensors, may prevent the device from operating if certain conditions are not met. For example, if a gate sensor detects that the gate is in an open position, the PLC will prevent the clamp assembly (208) from being operated.

In another example embodiment, the apparatus (900) has two in-line gates so that a pallet (112) and pallet load (802) may be loaded in through the first gate (218) (depicted in FIG. 1A and FIG. 4), the pallet (112) may be replaced, and the new instance of the pallet (112) and pallet load (802) removed from a second gate (not depicted), which would be opposite the first gate (218). In this example embodiment, a movable instance of the front gate (3) and a movable instance of the rear gate are provided that allow for a pallet (112) and a pallet load (802) to be loaded into the front gate (3). Once the pallet (112) has been exchanged, the new instance of the pallet (112) and the pallet load (802) can then be unloaded through the rear gate. In this particular embodiment, both gates may have the extension assembly (214) for their instance of the compression assembly (216). A skilled technician would understand, however, that one or both of the gates may not require an extension assembly (214) depending on the application.

In another example embodiment, only one of each of the pairs of sides (234) (depicted in FIG. 6) may have an extension assembly (214) (depicted in FIG. 8). That is, only one of the first side and the second side may have an extension assembly (214). Similarly, only one of the front side and the back side (or the front gate (3) and the back gate) may have the extension assembly (214). Furthermore, in another example embodiment, all sides and both the front side and the back side may have the extension assembly (214). This will depend on the operating environment of the device. For example, in a distribution center where light instances of the pallet load (802) (such as foodstuffs) are handled, the device may only require an extension assembly (214) on the rear frame (2) and a single side frame.

In another example embodiment, the apparatus (900) can be used on operational surfaces such as gravity rollers or conveyors to exchange instances of the pallet (112). In this example embodiment, a pallet (112) and the pallet load (802) are placed on a gravity roller. The gravity roller allows the pallet (112) and the pallet load (802) to be repositioned on the gravity roller. In this case, the pallet (112) and the pallet load (802) are repositioned into a pallet exchanger (902), as described above. In this example embodiment, the gravity roller is configured so that the bottom edge of the pressure plates is aligned with the bottom of the pallet load (802). When the clamp assembly (208) is activated and the pallet load (802) is frictionally connected to the pressure plates, the gravity roller drops, thereby separating the pallet load (802) from the pallet (112) and allowing the pallet (112) to pass under the front gate (3) or the rear frame (2). The operator can then replace the pallet (112). Once the replacement instance of the pallet (112) is put into position under the pallet load (802), the gravity roller is raised so that the replacement instance of the pallet (112) and the pallet load (802) are connected. The replaced instance of the pallet (112) and the pallet load (802) can then be removed from the apparatus (900) once the clamp assembly (208) is released and the front gate (3) is raised.

The following clauses are offered as further description of the examples of the apparatus. Any one or more of the following clauses may be combinable with any another one or more of the following clauses. Any one of the following clauses may stand on its own merit without having to be combined with another other of the above-identified clauses. Clause (1): an apparatus, comprising: a pallet-receiving assembly (906) having a pallet-receiving zone (908) being configured to receive, at least in part, a pallet (112) supporting a pallet load (802), the pallet-receiving assembly (906) having a vertical height being dimensioned marginally higher than the vertical height of the pallet (112); and a clamp assembly (208) having a clamping zone (904) being configured to circumscribe, at least in part, each side of the pallet load (802) being received, at least in part, in the clamping zone (904). Clause (2): the apparatus of any clause mentioned in this paragraph, the apparatus comprising: a pallet-receiving assembly (906) having a pallet-receiving zone (908) being configured to receive, at least in part, a pallet (112) supporting a pallet load (802) from a pallet transporter (804), the pallet-receiving zone (908) having a vertical height being dimensioned marginally higher than the vertical height of the pallet (112); and a clamp assembly (208) having a clamping zone (904) being configured to circumscribe, at least in part, each side of the pallet load (802) being received, at least in part, in the clamping zone (904), and the pallet-receiving zone (908) being positioned vertically below and proximate to the clamping zone (904). Clause (3): the apparatus of any clause mentioned in this paragraph, wherein: the pallet-receiving zone (908) is located proximate to the clamp assembly (208). Clause (4): the apparatus of any clause mentioned in this paragraph, wherein: the clamp assembly (208) is configured to: receive, at least in part, the pallet load (802) once the pallet (112) is received, at least in part, in the pallet-receiving zone (908); and apply a clamping force, at least in part, to the pallet load (802) while not applying the clamping force to the pallet (112) being received in the pallet-receiving zone (908) in such a way that the pallet (112) is removable from the pallet-receiving zone (908) without moving the pallet load (802) from the clamping zone (904). Clause (5): the apparatus of any clause mentioned in this paragraph, wherein: the pallet-receiving assembly (906) is configured to receive the pallet (112) supporting the pallet load (802) from the pallet transporter (804) in such a way that the pallet transporter (804) positions and continues to maintain a bottom portion of the pallet (112) proximate to a ground surface once the pallet (112) is received in the pallet-receiving assembly (906) while the clamp assembly (208) clamps the pallet load (802). Clause (6): the apparatus of any clause mentioned in this paragraph, wherein: the clamp assembly (208) circumscribes, at least in part, each side of the pallet load (802) from a bottom zone to a top zone of the pallet load (802). Clause (7): the apparatus of any clause mentioned in this paragraph, wherein: the clamp assembly (208) is configured to hold the pallet load (802) being received in the pallet-receiving assembly (906) in such a way that the pallet (112) no longer supports the pallet load (802), and the pallet transporter (804) removes the pallet (112) without the pallet load (802) from the pallet-receiving assembly (906) while a bottom portion of the pallet (112) remains proximate to a ground surface, and while the clamp assembly (208) continues to hold the pallet load (802). Clause (8): the apparatus of any clause mentioned in this paragraph, wherein: the clamp assembly (208) has a lower portion being positioned proximate to a bottom-most portion of the pallet load (802) once the pallet-receiving assembly (906) receives the pallet (112) supporting the pallet load (802) from the pallet transporter (804). Clause (9): the apparatus of any clause mentioned in this paragraph, wherein: the clamp assembly (208) has a bottom section being configured to be positionable above and proximate to a top portion of the pallet (112) once the pallet transporter (804) positions a bottom portion of the pallet (112) proximate to a ground surface in the pallet-receiving assembly (906). Clause (10): the apparatus of any clause mentioned in this paragraph, wherein: the pallet-receiving zone (908) is configured to limit a range of vertical movement of the pallet (112) within the pallet-receiving zone, and the pallet-receiving zone (908) is located immediately underneath and adjacent to the clamp assembly (208). Clause (11): the apparatus of any clause mentioned in this paragraph, wherein: the pallet-receiving zone (908) defines for, the pallet (112), upper and lower vertical height travel limits being limited to a marginal clearance required to move the pallet away from the pallet-receiving zone (908) plus a nominal vertical height of the pallet. Clause (12): the apparatus of any clause mentioned in this paragraph, wherein: the pallet-receiving assembly (906) includes: a first side frame (1) and a second side frame (22) being disposed upon an operating surface in spaced apart and substantially parallel relation; a back frame (202) being disposed intermediate to the first side frame (1) and the second side frame (22), and forming a close therewith having an open entry side for receiving the pallet (112) with the pallet load (802); and a front gate (3) being moveably connected to the first side frame (1) and the second side frame (22), the front gate (3) being in a separated and substantially parallel relation to the back frame (202), and the front gate (3) having an open position and a closed position; any one of a bottom of the back frame (202) and the front gate (3) and the operating surface forming an open sectional area allowing passage therethrough of the pallet (112); and for a case where the front gate (3) is in the open position, the pallet (112) with the pallet load (802) is received by and removed from the close. Clause (13): the apparatus of any clause mentioned in this paragraph, wherein: the clamp assembly (208) is attached to the first side frame (1) and the second side frame (22) and to the front gate (3), to provide an inwardly directed controllable clamping force intermediate to the first side frame (1) and the second side frame (22), and intermediate to the back frame (202) and the front gate (3) for releasably gripping the pallet load (802); and for a case where the front gate (3) is in the closed position, the clamp assembly (208) is operable for releasably gripping the pallet load (802) within the close so that the pallet (112) can be separated from the pallet load (802). Clause (14): the apparatus of any clause mentioned in this paragraph, wherein: for a case where the front gate (3) is in the open position, the clamp assembly (208) is inoperable. Clause (15): the apparatus of any clause mentioned in this paragraph, wherein: the clamp assembly (208) includes: a first instance of a compression assembly (216) adjustably connected to the first side frame (1) and the second side frame (22) being in opposing relation for controllably exerting an inwardly directed force therebetween. Clause (16): the apparatus of any clause mentioned in this paragraph, wherein: the clamp assembly (208) further includes: a second instance of the compression assembly (216) adjustably connected to the back frame (202) and the front gate (3) for controllably exerting the inwardly directed force therebetween. Clause (17): the apparatus of any clause mentioned in this paragraph, wherein: each compression assembly (216) comprises: a pressure plate (4) being spaced inwardly of each of the first side frame (1) and the second side frame (22) and the front gate (3); and an extension assembly (214) sandwiched between each instance of the pressure plate (4) and a corresponding instance of any one of the first side frame (1) and the second side frame (22) and the front gate (3) and fixedly attached thereto, the extension assembly (214) being responsive to an applied amount of pressurized fluid for restorably extending the extension assembly (214) along a longitudinal axis thereof and restorably displacing the pressure plate (4) in the same direction. Clause (18): the apparatus of any clause mentioned in this paragraph, wherein: each compression assembly (216) comprises: a pressure plate (4) being spaced inwardly of each of the first side frame (1) and the second side frame (22) and the front gate (3); and extension assembly (214) sandwiched between at least one instance of the pressure plate (4) and a corresponding instance of any one of a frame and the front gate (3) and fixedly attached thereto, the extension assembly (214) being responsive to an applied amount of pressurized fluid for restorably extending the extension assembly (214) along a longitudinal axis thereof and restorably displacing the pressure plate (4) in the same direction. Clause (19): the apparatus of any clause mentioned in this paragraph, wherein: the extension assembly (214) is sandwiched between the first side frame (1) and the second side frame (22) and the pressure plate (4). Clause (20): the apparatus of any clause mentioned in this paragraph, wherein: the extension assembly (214) is sandwiched between the back frame (202) and a corresponding instance of the pressure plate (4). Clause (21): the apparatus of any clause mentioned in this paragraph, wherein: the extension assembly (214) is sandwiched between the front gate (3) and a corresponding instance of the pressure plate (4). Clause (22): the apparatus of any clause mentioned in this paragraph, wherein: the pressure plate (4) includes: a sloping wall portion disposed divertingly outwardly of an interior. Clause (23): the apparatus of any clause mentioned in this paragraph, wherein: the pressure plate (4) is coated with a urethane layer for improving grip. Clause (24): the apparatus of any clause mentioned in this paragraph, wherein: a tension spring assembly (236) being connected between the pressure plate (4) and corresponding instance of any one of the first side frame (1) and the second side frame (22) for returning the pressure plate (4) to a rest position when pressurized fluid is released from the extension assembly (214). Clause (25): the apparatus of any clause mentioned in this paragraph, wherein: guide assembly (222) for centrally positioning the pallet (112) and the pallet load (802). Clause (26): the apparatus of any clause mentioned in this paragraph, wherein: the guide assembly (222) comprises: a pair of sloping rails disposed converging inwardly. Clause (26): the apparatus of any clause mentioned in this paragraph, wherein: the guide assembly (222) comprises: a pair of sloping rails disposed converging inwardly. Clause (27): the apparatus of any clause mentioned in this paragraph, wherein: the front gate (3) is pivotally connected to any one of the first side frame (1) and the second side frame (22). Clause (28): the apparatus of any clause mentioned in this paragraph, wherein: the front gate (3) includes: a locking assembly at an opposite end of the front gate (3) relative to a moveable connection, the locking assembly releasably interfacing with a receiver on any one of the first side frame (1) and the second side frame (22). Clause (29): the apparatus of any clause mentioned in this paragraph, wherein: the clamp assembly (208) is adjustable inwardly towards the pallet load (802) and outwardly away from the pallet load (802). Clause (30): a method comprising: receiving, at least in part, a pallet (112) supporting a pallet load (802) in a pallet-receiving zone (908) of a pallet-receiving assembly (906) having a vertical height being dimensioned marginally higher than the vertical height of the pallet (112); and circumscribing, at least in part, each side of the pallet load (802) being received, at least in part, in a clamping zone (904) of a clamp assembly (208).

It will be appreciated that the embodiments described above may be varied to meet particular specialized requirements without departing from the true spirit and scope of the invention disclosed. The above embodiments are not to be taken as indicative of the limits of the invention but rather as exemplary structures which are described by the provided description and claims.

What is claimed is:

1. An apparatus, comprising:
   a pallet-receiving assembly having a frame of generally rectangular shape defined by a plurality of laterally-extending, side frame members bounding a pallet-receiving zone configured to receive, at least in part, a pallet supporting a pallet load, the pallet-receiving assembly having a vertical height greater than the vertical height of the pallet;
   a gate mechanism connected to one of the frame members, the gate mechanism being actuatable between open and closed positions to permit controlled ingress and egress of a palletized load in to and out of a palletized load receiving zone;
   a clamp assembly having a clamping zone being configured to circumscribe, at least in part, each side of the pallet load being received, at least in part, in the clamping zone;
   wherein the pallet-receiving assembly is securable to any one of a ground or operational work surface; and
   the pallet-receiving assembly includes:
   a first side frame and a second side frame being disposed upon the ground or the operational work surface in spaced apart and substantially parallel relation;
   a back frame being disposed intermediate to the first side frame and the second side frame, and forming a close therewith having an open entry side for receiving the pallet with the pallet load; and
   a gate, associated with the frame member connected to the gate mechanism, the gate being in a separated and substantially parallel relation to the back frame, and the gate having an open position and a closed position;
   any one of a bottom of the back frame and the gate, and, the ground or the operational work surface forming an open sectional area allowing passage therethrough of the pallet; and for a case where the gate is in the open position, the pallet with the pallet load is received by and removed from the close.

2. The apparatus of claim 1, wherein:
the pallet-receiving zone is located proximate to the clamp assembly.

3. The apparatus of claim 1, wherein:
the clamp assembly is configured to:
receive, at least in part, the pallet load once the pallet is received, at least in part, in the pallet-receiving zone; and
apply a clamping force, at least in part, to the pallet load while not applying the clamping force to the pallet being received in the pallet-receiving zone such that the pallet is removable from the pallet-receiving zone without moving the pallet load from the clamping zone.

4. The apparatus of claim 1, wherein:
the clamp assembly circumscribes, at least in part, each side of the pallet load from a bottom zone to a top zone of the pallet load.

5. The apparatus of claim 1, wherein:
the pallet-receiving zone is configured to limit a range of vertical movement of the pallet within the pallet-receiving zone, and the pallet-receiving zone is located immediately underneath and adjacent to the clamp assembly.

6. The apparatus of claim 1, wherein:
the pallet-receiving zone defines for, the pallet, upper and lower vertical height travel limits being limited to a marginal clearance required to move the pallet away from the pallet-receiving zone plus a nominal vertical height of the pallet.

7. The apparatus of claim 1, wherein:
the front gate is pivotally connected to any one of the first side frame and the second side frame.

8. The apparatus of claim 1, wherein:
the gate includes:
a locking assembly at an opposite end of the gate relative to a moveable connection, the locking assembly releasably interfacing with a receiver on any one of the first side frame and the second side frame.

9. The apparatus of claim 1, wherein:
the clamp assembly is adjustable inwardly towards the pallet load and outwardly away from the pallet load.

10. The apparatus of claim 1, wherein the pallet-receiving assembly and the clamp assembly are configured so that an overhead area of the clamping zone is unobstructed.

11. The apparatus of claim 1, further comprising:
guide assembly for centrally positioning the pallet and the pallet load.

12. The apparatus of claim 11, wherein:
the guide assembly comprises:
a pair of sloping rails disposed converging inwardly.

13. The apparatus of claim 1, wherein:
the pallet-receiving zone is positioned vertically below and proximate to the clamping zone.

14. The apparatus of claim 13, wherein:
the pallet-receiving assembly is configured to receive the pallet supporting the pallet load from the pallet transporter in such a way that the pallet transporter positions and continues to maintain a bottom portion of the pallet proximate to a ground surface once the pallet is received in the pallet-receiving assembly while the clamp assembly clamps the pallet load.

15. The apparatus of claim 13, wherein:
the clamp assembly is configured to hold the pallet load being received in the pallet-receiving assembly such that the pallet no longer supports the pallet load, and the pallet transporter removes the pallet without the pallet load from the pallet-receiving assembly while a bottom portion of the pallet remains proximate to a ground surface, and while the clamp assembly continues to hold the pallet load.

16. The apparatus of claim 13, wherein:
the clamp assembly has a lower portion being positionable proximate to a bottom-most portion of the pallet load once the pallet-receiving assembly receives the pallet supporting the pallet load from the pallet transporter.

17. The apparatus of claim 13, wherein:
the clamp assembly has a bottom section positionable above and proximate to a top portion of the pallet once the pallet transporter positions a bottom portion of the pallet proximate to a ground surface in the pallet-receiving assembly.

18. The apparatus of claim 13, wherein the pallet-receiving assembly and the clamp assembly are configured so that an overhead area of the clamping zone is unobstructed.

19. The apparatus of claim 1, wherein:
the clamp assembly is attached to the first side frame and the second side frame and to the gate, to provide an inwardly directed controllable clamping force intermediate to the first side frame and the second side frame, and intermediate to the back frame and the gate for releasably gripping the pallet load; and
for a case where the gate is in the closed position, the clamp assembly is operable for releasably gripping the pallet load within the close so that the pallet can be separated from the pallet load.

20. The apparatus of claim 19, wherein:
for a case where the gate is in the open position, the clamp assembly is inoperable.

21. The apparatus of claim 19, wherein:
the clamp assembly includes:
a first instance of a compression assembly adjustably connected to the first side frame and the second side frame being in opposing relation for controllably exerting an inwardly directed force therebetween.

22. The apparatus of claim 21, wherein:
the clamp assembly further includes:
a second instance of the compression assembly adjustably connected to the back frame and the gate for controllably exerting the inwardly directed force therebetween.

23. The apparatus of claim 22, wherein:
each compression assembly comprises:
a pressure plate being spaced inwardly of each of the first side frame and the second side frame; and
an extension assembly sandwiched between at least one instance of the pressure plate and a corresponding instance of any one of the frames and fixedly attached thereto, the extension assembly being responsive to an applied amount of pressurized fluid for restorably extending the extension assembly along a longitudinal axis thereof and restorably displacing the pressure plate in the same direction.

24. The apparatus of claim 22, wherein:
each compression assembly comprises:
a pressure plate being spaced inwardly of each of the first side frame and the second side frame and the gate; and
an extension assembly sandwiched between the pressure plates of the first side frame and the second side frame and fixedly attached thereto, the extension assembly being responsive to an applied amount of pressurized fluid for restorably extending the extension assembly along a longitudinal axis thereof and restorably displacing the pressure plate in the same direction.

25. The apparatus of claim 24, wherein:

the extension assembly is sandwiched between the first side frame and the second side frame and the pressure plate.

26. The apparatus of claim 24, wherein:

the extension assembly is sandwiched between the back frame and a corresponding instance of the pressure plate.

27. The apparatus of claim 24, wherein:

the pressure plate includes:

a sloping wall portion disposed divertingly outwardly of an interior.

28. The apparatus of claim 24, wherein:

the pressure plate is coated with a urethane layer for improving grip.

29. The apparatus of claim 24, further comprising:

a tension spring assembly being connected between the pressure plate and corresponding instance of any one of the first side frame and the second side frame for returning the pressure plate to a rest position when pressurized fluid is released from the extension assembly.

\* \* \* \* \*